US011815306B2

(12) United States Patent
Siddiqui et al.

(10) Patent No.: US 11,815,306 B2
(45) Date of Patent: Nov. 14, 2023

(54) DYNAMIC TEMPERATURE REGULATING DEVICE

(71) Applicant: THERMOCAN DYNAMICS INC., London (CA)

(72) Inventors: Kamran Siddiqui, London (CA); Steven Michael Jevnikar, London (CA); Alp Sener, London (CA); Anthony Michael Jevnikar, London (CA); Jeffrey Andrew Jevnikar, London (CA)

(73) Assignee: THERMOCAN DYNAMICS INC., London (CA)

( * ) Notice: Subject to any disclaimer, the term of this patent is extended or adjusted under 35 U.S.C. 154(b) by 0 days.

(21) Appl. No.: 17/609,600

(22) PCT Filed: Jun. 17, 2020

(86) PCT No.: PCT/CA2020/050836
§ 371 (c)(1),
(2) Date: Nov. 8, 2021

(87) PCT Pub. No.: WO2020/252573
PCT Pub. Date: Dec. 24, 2020

(65) Prior Publication Data
US 2022/0154992 A1 May 19, 2022

Related U.S. Application Data

(60) Provisional application No. 62/862,369, filed on Jun. 17, 2019.

(51) Int. Cl.
*F25D 3/00* (2006.01)
*A01N 1/02* (2006.01)
(Continued)

(52) U.S. Cl.
CPC ........... *F25D 3/005* (2013.01); *A01N 1/0247* (2013.01); *F25D 15/00* (2013.01); *F25D 17/02* (2013.01);
(Continued)

(58) Field of Classification Search
CPC . F25D 3/005; F25D 9/00; F25D 15/00; F28D 20/021; F28D 20/026; A62B 17/005; A01N 1/0242; A01N 1/0263
See application file for complete search history.

(56) References Cited

U.S. PATENT DOCUMENTS 2,043,163 A * 6/1936 Goosmann ................ F25D 9/00
62/424
2,342,211 A * 2/1944 Newton ................ F24F 5/0046
165/104.31
(Continued)

FOREIGN PATENT DOCUMENTS

BR 102014017208 A2 7/2015
CN 104816883 A 8/2015
(Continued)

*Primary Examiner* — Christopher R Zerphey
(74) *Attorney, Agent, or Firm* — HILL & SCHUMACHER

(57) ABSTRACT

A dynamic temperature regulating device is for use in association with a temperature-controlled container. The dynamic temperature regulating device includes at least one heat source, at least one heat sink, a heat transfer medium and a control system. At least one of the heat source and the heat sink is a PCM (phase change material). The heat transfer medium is in thermal communication with and operably connected to the at least one heat source and the at least one heat sink. The control system is for controlling the selective thermal communication with the at least one heat source and with the at least one heat sink to regulate the temperature of the temperature-controlled container. A detachable PCM contained volumes includes a sealed hous-
(Continued)

ing, a phase change material and a heat transfer medium and functions as a PCM thermal energy storage volume.

39 Claims, 19 Drawing Sheets

(51) Int. Cl.
 *F25D 15/00* (2006.01)
 *F25D 17/02* (2006.01)
 *F28D 20/02* (2006.01)
(52) U.S. Cl.
 CPC ......... *F28D 20/021* (2013.01); *F28D 20/026* (2013.01); *F28D 20/028* (2013.01)

(56) References Cited

U.S. PATENT DOCUMENTS

| | | | | |
|---|---|---|---|---|
| 3,378,062 A | * | 4/1968 | Ringquist | F25B 29/003 62/159 |
| 3,693,704 A | * | 9/1972 | Newton | F24F 3/08 165/221 |
| 4,131,158 A | * | 12/1978 | Abhat | F28D 20/021 165/104.31 |
| 6,481,216 B2 | * | 11/2002 | Simmons | F28F 3/022 62/436 |
| 6,604,373 B1 | * | 8/2003 | Burger | F24F 5/0017 62/260 |
| 7,505,269 B1 | * | 3/2009 | Cosley | F28D 15/0275 165/104.33 |
| 2014/0284020 A1 | * | 9/2014 | Amir | F28D 20/021 165/10 |
| 2016/0243000 A1 | | 8/2016 | Gray | |
| 2017/0131014 A1 | | 5/2017 | Farrar | |
| 2018/0086534 A1 | | 3/2018 | Kilmer et al. | |
| 2019/0128589 A1 | * | 5/2019 | Adams | F25D 11/003 |

FOREIGN PATENT DOCUMENTS

| | | | | |
|---|---|---|---|---|
| DE | 543370 C | * | 2/1932 | ............... F25D 9/00 |
| JP | 5099503 B2 | | 10/2012 | |
| WO | 2006007663 A1 | | 1/2006 | |
| WO | 2016168523 A1 | | 10/2016 | |

* cited by examiner

DYNAMIC TEMPERATURE REGULATING DEVICE

CROSS-REFERENCE TO RELATED APPLICATIONS

This application is a National Phase of PCT Application No. PCT/CA2020/050836, filed on Jun. 17, 2020, and published on Dec. 24, 2020 as WO 2020/252573, in English, which claims priority to U.S. Provisional Patent Application No. 62/862,369, filed on Jun. 17, 2019, all of which are incorporated herein by reference in their entirety.

FIELD OF THE DISCLOSURE

This disclosure relates to temperature-controlled packaging and transportation devices and in particular a dynamic temperature regulating device for temperature-controlled packaging and transportation.

BACKGROUND

Transportation and shipment of temperature-sensitive items in a controlled manner is critical in a wide range of applications and it also has many associated challenges. In the field of medicine, improper handling of temperature-sensitive products, such as, vaccines, biological samples, bio-organisms, chemicals, pharmaceuticals, medical devices, cells, tissues and organs for transplantation can result in product deterioration or loss, and have a significant negative impact on human health. Temperature-controlled packaging (TCP) is utilized in the shipment of temperature-controlled products. There are three primary types of TCP: active, passive, and hybrid. Active systems use a power source to maintain a temperature, while passive systems rely on refrigerants and insulated packaging alone. Hybrid systems use a combination of both.

The use of active TCP systems is very limited due to the need of a power source for heating or cooling. A battery may provide such electrical power, but considering the energy demand, substantially large battery packs are needed, which have their own safety concerns (lithium ion, lithium polymer) and logistical issues. Most of the current TCP systems in use today only have the ability to lower a temperature through cooling or raise a temperature through heating, relative to a reference or set temperature. Products, particularly those biological in nature, require precise temperature control often within a few degrees, depending on the product and duration of storage or transportation. This presents a problem however, as systems lack the ability to precisely control the temperature above and below the reference or set temperature, which itself may need to change during the transportation due to changing surrounding conditions or the requirements of the product itself. Changing ambient temperatures during storage or transportation present a huge challenge for products that require a set temperature within a narrow range between 4 and 37 Celsius. For example, the surrounding temperature of a product can rapidly increase to well over 30 Celsius during transportation on an airport tarmac during summer, but once in the air, the surrounding temperature can drop to well under −20 Celsius. Furthermore, current TCP devices have limited functionality to monitor external temperatures and provide on demand heating or cooling to maintain a highly sensitive temperature set-point.

The motivation behind the development of this technology originated from the field of medicine, specifically for the transportation of organs used in solid organ transplantation. The removal of organs either from deceased or living donors, is invariably associated with injury that begins immediately with the loss of blood supply. While storage under hypothermic conditions can extend storage times, cells within organs continue to undergo activity requiring energy, despite loss of blood supply, by transitioning to 'anaerobic' metabolism. In addition to ongoing injury during storage, 'anaerobic' metabolism generates metabolites that further promote organ damage post-transplant (ischemia reperfusion injury). Injury can be attenuated but not eliminated, by the use of specialized buffer solutions, pulsatile perfusion of these buffers through the organ, lowering the temperature to greatly reduce metabolic demand or percolating oxygen in the buffer solutions. The length of cold 'ischemic' storage increases the damage that is sustained by the organ, and thus there is a high priority placed on rapid transportation and transplantation. However, in practice, shortening the storage time is not always feasible as transportation can be national or international, or delayed, and recipients may require preparation ahead of transplantation. Thus, an effective target strategy to reduce organ injury remains modification(s) of storage conditions and buffers.

In current practice, during transportation, the organ is stored under hypothermic conditions either in an ice bath kept around 3 to 4 degrees Celsius, or in a storage apparatus that utilizes an ice bath to not only keep the organ 'cool' but also to cool perfusion buffers that are circulated through the organ at 3 to 4 degrees Celsius. The organ following procurement from the donor is immediately placed into these cold storage conditions until transplant. There are no current clinical tests that can practically determine the amount of organ damage in 'real time' while in storage and so defining critical times for transplantation remains empiric. Some potentially useable or salvageable organs that are stored for long times (>36 hours) are unfortunately discarded. Recently, there has been a move away from hypothermic storage at 4 degrees Celsius to a 'physiologic' temperature of 37 degrees Celsius, which is now referred to as 'normothermic' storage. While more physiologic in terms of allowing normal metabolism of cells within organs, the requirement for oxygen to be percolated into the buffer solution, as well as precise temperature control within a narrow range that cannot exceed 37 degrees Celsius, has made such systems complex, very expensive and with their size, difficult to transport in small vehicles or aircraft. This is related to power storage, compressor based cooling and warming units, oxygen diffusion membranes and circuits, peristaltic pumps, lines and sophisticated control units.

The biology of organ injury is complex and there are endogenous differences between various solid organs in their response to removal from blood supply and susceptibility to ischemic injury. Thus, there have been evolving storage strategies used by various transplant centres as the 'optimum' temperature for organ storage has not been defined, nor have buffer systems for other than 4 degrees Celsius. While some organs may be adequately preserved using conventional and short term 4-degree Celsius storage, there is growing and strong data that the range in optimal temperatures is wide being from 4 to 37 degrees. The selection of 4 degrees Celsius has been greatly related to the availability of ice as a cooling source.

In addition to storage that allows transportation and timing of transplants, an additional important consideration and limitation of current storage technology is limitation of organ rehabilitation and modification to improve function following transplantation. While 4 degrees Celsius slows metabolic demand to limit injury even with generation of anaerobic metabolites, this temperature does not permit optimizing or applying endogenous or exogenous repair pathways that would improve function. This includes the use of drugs, cytokines, gasotransmitters, nucleic acid-based therapeutics such as RNA silencing, and viral vectors that can express moieties, proteins or products that modify or prevent cell death, or attenuate organ injury. Hypothermia may attenuate the benefit of oxygen administration to temperatures that support some aerobic metabolism.

It is clear that the optimal strategy for organ storage and transportation has yet to be defined but will undoubtedly include a range of temperatures—each optimal for the phases of transportation, storage and organ rehabilitation. For example, hypothermia might be used for immediate post procurement storage, normothermic or sub normothermic temperatures to allow organ rehabilitation and modification and incorporation of agents that require normothermic temperatures, followed by sub normothermic conditions for transport using tissue injury modifying agents that work optimally at temperatures that vary with each agent. Finally, there may be a clinical benefit to increase the organ temperature to near 37 degrees Celsius immediately prior to transplantation into recipients. Currently, there is no technology that can provide this complex regulation of organ storage temperatures.

SUMMARY

A dynamic temperature regulating device is for use in association with a temperature-controlled container. The dynamic temperature regulating device includes at least one heat source, at least one heat sink, a heat transfer medium and a control system. At least one of the heat source and the heat sink is a PCM (phase change material). The heat transfer medium is in thermal communication with and operably connected to the at least one heat source and the at least one heat sink. The control system is for controlling the selective thermal communication with the at least one heat source and with the at least one heat sink to regulate the temperature of the temperature-controlled container.

The at least one heat source and the at least one heat sink may each be PCMs.

The dynamic temperature regulating device as claimed in claim 2 wherein each PCM is in a housing.

The housing of each PCM may be sealed.

The housing of each PCM is sealed and watertight.

The housing may include a selective portion being a housing heat transfer medium.

The housing heat transfer medium may include an internal portion. The internal portion of the housing heat transfer medium may include at least one fin. The internal portion of the housing heat transfer medium may include at least one tube and each tube may be filled with heat transfer fluid. The internal portion of the housing heat transfer medium may include at least one heat pipe. The internal portion of the housing heat transfer medium may be a heat transfer porous material. The internal portion of the housing heat transfer medium is a combination of at least two of at least one fin, at least one tube, at least one heat pipe, a heat transfer porous material.

The heat transfer medium may be a heat transfer element.

The heat transfer element may include conduits and the conduits may have working heat exchange fluid therein and wherein the working heat exchange fluid may be in flow communication with the temperature-controlled container for moving the working heat exchange fluid through the temperature-controlled container via one of direct contact and indirect contact.

The dynamic temperature regulating device may include at least one heat transfer enhancement device in thermal communication between the heat transfer medium and the housing.

The heat transfer enhancement device may include at least one heat pipes.

The heat transfer enhancement device may include at least one heat transfer fin.

The heat transfer element may be a solid plate.

The heat source may define a heat source volume for a working heat exchange fluid and the heat sink may define a heat sink volume for a working heat exchange fluid and may have at least one device operably connected to the working heat-exchange fluid for selectively moving the working heat-exchange fluid through the heat source volume, for selectively moving the working heat exchange fluid through the heat sink volume.

The working heat-exchange fluid may include a heat source working heat exchange fluid and a heat sink working heat-exchange fluid and the heat source working heat exchange fluid may be in flow communication with the heat source volume and the heat sink working heat-exchange fluid may be in flow communication with the heat sink volume. The same working heat-exchange fluid may be in flow communication with the heat source volume and the heat sink volume. The working heat exchange fluid may be in flow communication with the temperature-controlled container. The working heat exchange fluid may be the same fluid as inside the temperature-controlled container.

The temperature-controlled container may include a first heat exchanger in flow communication with the heat source working heat-exchange fluid and a second heat exchanger in flow communication with heat sink working heat-exchange fluid.

The temperature-controlled container may include one heat exchanger in flow communication with the heat source working heat-exchange fluid and the heat sink working heat-exchange fluid.

The at least one heat source may be a plurality of heat source volumes. The plurality of heat source volumes may include PCM's having different melting temperatures.

The at least one heat sink is a plurality of heat sink volumes. The plurality of heat sink volumes may include PCM's having different melting temperatures.

The working heat-exchange fluid may be a liquid and the fluid moving device may be a pump.

The working heat-exchange fluid may be a gas and the fluid moving device may be a fan or a blower.

The dynamic temperature regulating device and the temperature-controlled container may include a plurality of sensors and the control system may be operably connected to the sensors. The temperature of the temperature-controlled container may be modified responsive to the temperature and/or other variables/parameters measured and communicated by the sensors and desired predetermined outcomes.

The desired predetermined outcome may be one of that the temperature of the temperature-controlled container is maintained at a predetermined target temperature; that the temperature of the temperature-controlled container is maintained within a target threshold of a predetermined target temperature range; and that the temperature of the temperature-controlled container is maintained within a target threshold of a predetermined target temperature for a predetermined period of time. The desired predetermined outcome may be that the temperature of the temperature-controlled container is raised to a predetermined target temperature at a predetermined time. The desired predetermined outcome may be that the temperature of the temperature-controlled container is lowered to a predetermined target temperature at a predetermined time. The desired predetermined outcome may be that the temperature of the temperature-controlled container is maintained at a predetermined target temperature or within a target threshold of a predetermined target temperature range at a predetermined location. The desired predetermined outcome may be that the temperature of the temperature-controlled container is raised to a predetermined target temperature at a predetermined location. The desired predetermined outcome may be that the temperature of the temperature-controlled container is lowered to a predetermined target temperature at a predetermined location.

The dynamic temperature regulating device may include a remote controller that is operably connected to the control system but not physically connected to the control system.

The heat-exchange fluid may be a buffer.

The heat-exchange fluid may provide sterile perfusion to the temperature-controlled container.

A detachable PCM contained volumes includes a sealed housing, a phase change material and a heat transfer medium. The sealed housing defines a volume having a selective portion being a housing heat transfer medium. The phase change material is in the volume of the sealed housing. The heat transfer medium is operably attachable to and in thermal communication with the housing heat transfer medium.

The housing heat transfer medium of the detachable PCM contained volumes may include an internal portion. The internal portion of the housing heat transfer medium may include at least one fin. The internal portion of the housing heat transfer medium may include at least one tube and each tube may be filled with heat transfer fluid. The internal portion of the housing heat transfer medium may be a heat transfer porous material. The internal portion of the housing heat transfer medium may be at least one heat pipe. The internal portion of the housing heat transfer medium may be a combination of at least two of at least one fin, at least one tube, at least one heat pipe, a heat transfer porous material.

The heat transfer medium of the detachable PCM contained volumes may include conduits and the conduits have working heat exchange fluid therein.

The PCM of the detachable PCM contained volumes may be one of a heat source and a heat sink.

The remainder of the housing of the detachable PCM contained volumes may be an insulating medium.

The heat transfer medium of the detachable PCM contained volumes may be a heat transfer surface.

The detachable PCM contained volumes may function as a thermal energy storage volume.

Further features will be described or will become apparent in the course of the following detailed description.

BRIEF DESCRIPTION OF THE DRAWINGS

The embodiments will now be described by way of example only, with reference to the accompanying drawings, in which.

DETAILED DESCRIPTION

Figure 1:
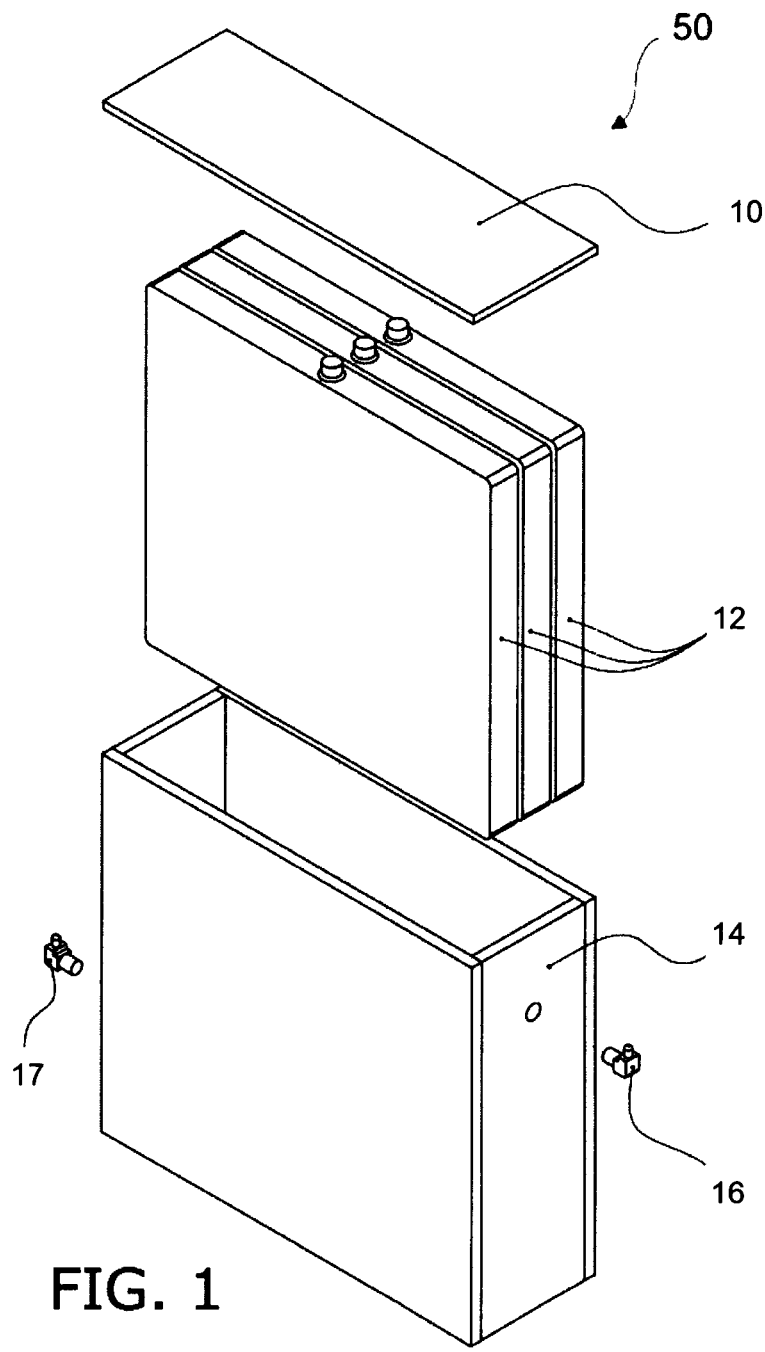
FIG. 1 is an exploded view of one configuration of the Phase Change Material (PCM) storage volume utilized in the dynamic temperature regulating device.

As used here in the phrase, Phase Change Material, (PCM) refers to a chemical substance that changes its phase during heat addition and heat release. For example, from solid to liquid i.e. melting during heat addition and from liquid to solid during heat release i.e. freezing. These substances exploit the enthalpy of phase change to store or release substantial amount of heat at a constant temperature (i.e. the melting/freezing or boiling/condensation temperature). Solid-liquid PCMs are commercially available over a wide range of melting temperatures from below −33 Celsius to above 850 Celsius. In the rest of the document, the word "PCM" refers to the solid-liquid PCM, but liquid-gas PCMs can also be used.

Before using the PCM in a given application, it needs to be conditioned i.e., the heat source PCM must be in the liquid state above its freezing temperature and the heat sink PCM must be in the solid state below its melting temperature. Once the conditioned PCMs are integrated into the system, they do not require any active energy source such as electricity. The PCMs that are currently used in commercial temperature-sensitive applications are predominantly for one type of temperature storage, either cold or hot storage, hence, the temperature stability they provide is static. Ice, for example, while excellent at keeping products cool, is unable to raise the temperature past 0 degrees Celsius.

To address the aforementioned shortcomings, an innovative technology has been developed which has the ability to control the product temperature at a constant target temperature or within a prescribed temperature interval, independent from the surrounding external environment. The dynamic temperature regulating device uses a combination of different PCMs with different melting temperatures, above and below the desired target temperature range as heat source and heat sink, respectively, thus providing heating or cooling to the temperature-controlled container and dynamic temperature regulation on demand. That is, when there is a demand for heat in the system, it is supplied from the PCM heat source and when there is demand for cooling, the excess heat is rejected to the PCM heat sink. This innovative combination of PCMs as heat sources and sinks along with the availability of PCMs over a wide temperature range, allow the control of temperature at almost all values of practical interest and over a range of variations. Furthermore, through the combination of passive heat sources and passive heat sinks, in conjunction with an active control system, this technology not only maintains a predefined target temperature or temperature interval, but also has the ability to dynamically adjust the product storage condition over a wide temperature range during transport, without any requirements of external active power source.

It will be appreciated by those skilled in the art that a wide variety of PCM's may be used for both the heat sources and the heat sinks. As an example, to dynamically control the temperature within a range 5 degree Celsius to 30 degree Celsius, lauric acid and paraffin wax are two examples of PCMs suitable as heat sources due to both their relatively high melting temperatures, 44 and ~50 degrees Celsius, respectively, and their high enthalpy of phase change. Ice is a common example of PCM used as a heat sink for its considerably high enthalpy of fusion and low melting temperature. Other materials suitable as heat sinks include, but are not limited to, diethylene glycol (melting point: −10 Celsius), dodecane (melting point: −9.6 Celsius), and a sodium-chloride based solution (melting point of 23.3 wt. % NaCl+H2O: −21.2 Celsius).

The current TCP portable products with non-active heating or cooling, including commercially available organ transport devices, neither have the ability to adjust the temperature (for example, between 4 and 37 Celsius for organ transport devices), nor do they have the capability to vary the temperature during transportation. For the specific example of organ transport, the dynamic temperature regulating device has the capability to achieve this, with (i) flexibility to either maintain a constant temperature or vary the temperature of the organ as needed, (ii) adaptability to easily change or ramp temperatures as more data defining ideal temperatures and more agents to reduce injury become clinically available, and (iii) portability, to allow devices to transport organs within or outside hospitals, and in current ground vehicles and aircraft. While the medical field was the initial focus, the dynamic temperature regulating device may be modified and expanded in a wide range of applications in other scientific and commercial fields which demand highly sensitive temperature control transportation. Such applications include transportation of vaccines, biological species, biological samples/products, chemical samples/products, food items, etc.

Figure 2:
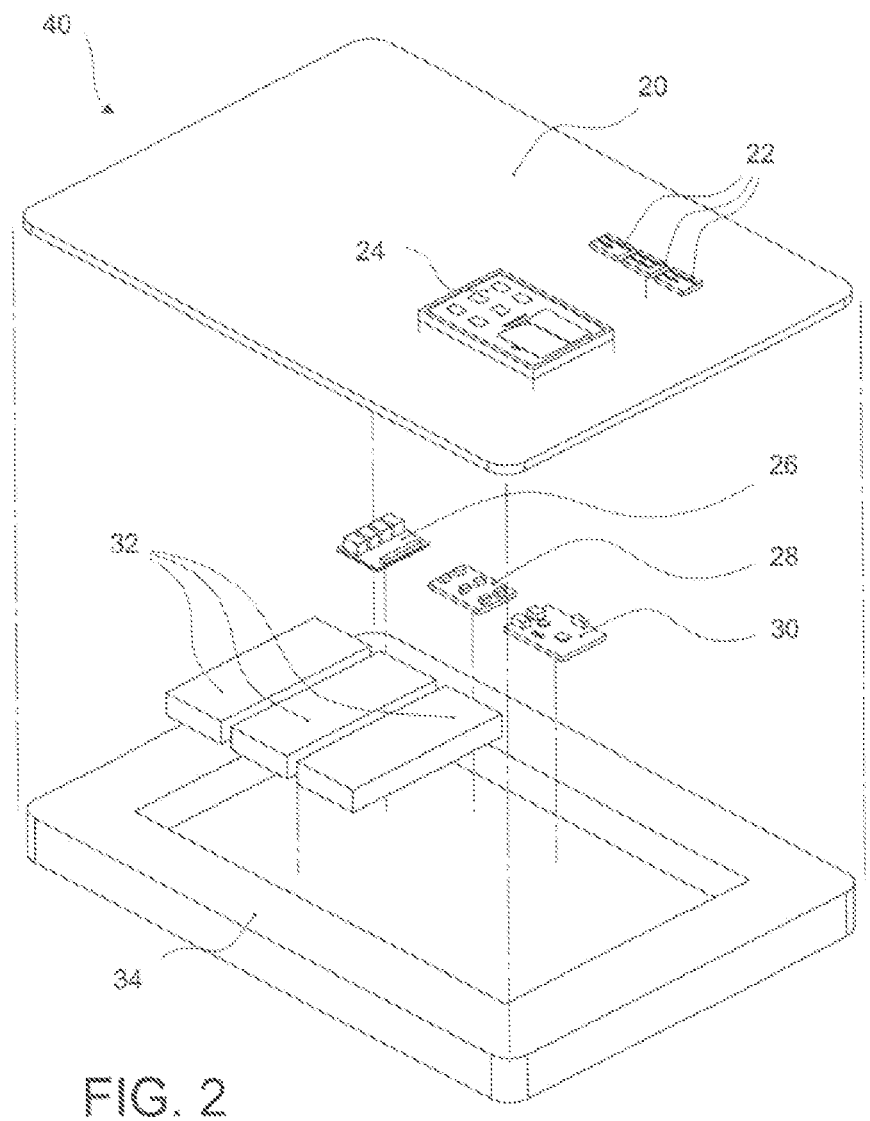
FIG. 2 is an exploded view of one configuration of the electronic components of the dynamic temperature regulating device.
Figure 3:
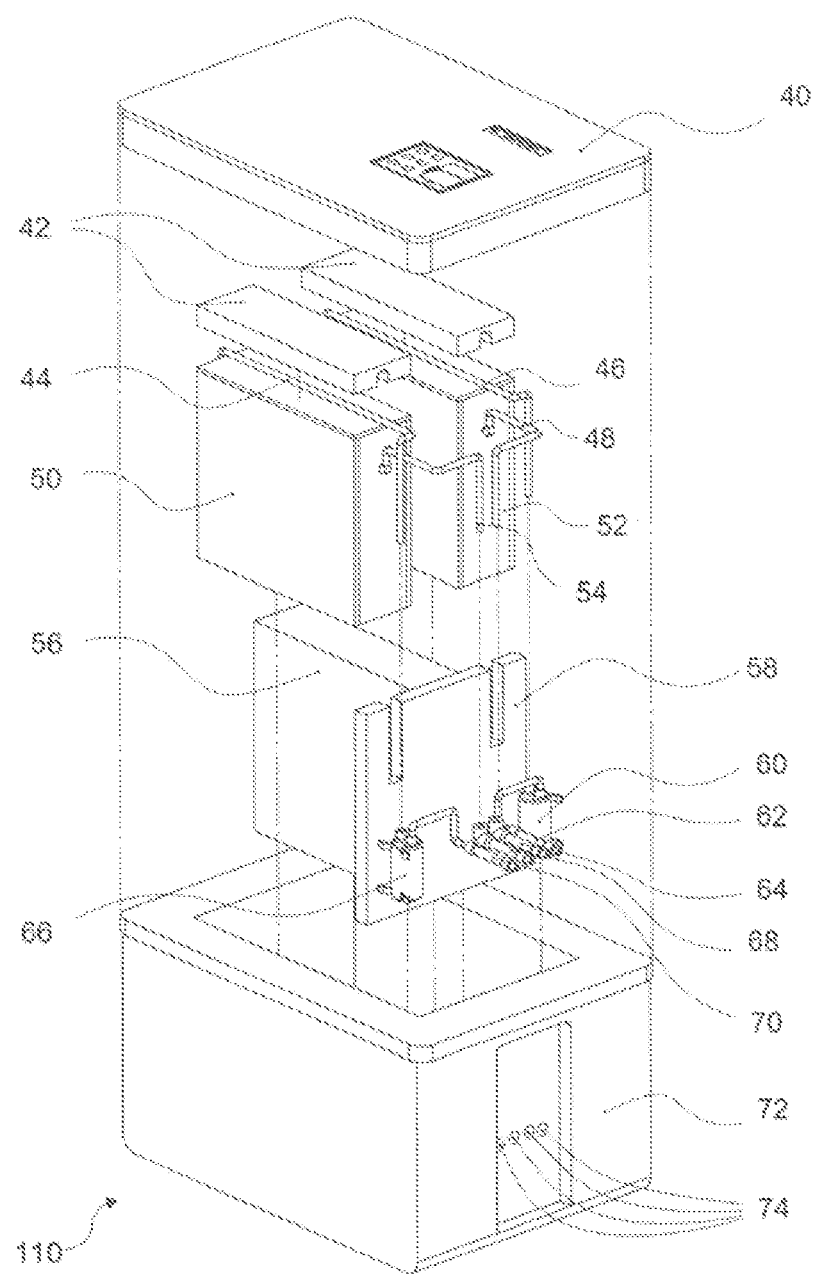
FIG. 3 is an exploded view of one configuration of the temperature controller system, including the PCMs, electronic components, plumbing and fluid moving devices.

An example of the dynamic temperature regulating device for temperature-controlled containers and transportation is shown in FIGS. 1 to 8 and 10 to 14. The dynamic temperature regulating device 110 includes at least one heat source; at least one sink, wherein at least one of the heat source and the heat sink is a PCM 12 (shown in FIGS. 1, 10, 11, and 12); a heat transfer medium in thermal communication with and operably connected to the at least one heat source and the at least one heat sink; and a control system 110 for controlling the selective thermal communication with the at least one heat source and with the at least one heat sink to regulate the temperature of the temperature-controlled container 100. The control system 110 (FIG. 3) has a plurality of electronic components (shown in FIG. 2) in the lid 40 thereof. The dynamic temperature regulating device 110 is operably connected to a temperature-controlled container 100.

The heat-exchange fluid may be a buffer or other solution such that the heat-exchange fluid provides sterile perfusion to organs or tissues stored in the temperature-controlled container 100. This will help to maintain or enhance the viability of the organs or tissues. This will also allow for the addition of oxygen, drugs, cytokines, gasotransmitters, nucleic acid-based therapeutics such as RNA silencing, and viral vectors that can express moieties, proteins or products that modify or prevent cell death, or other agents that attenuate injury or improve viability.

PCM Storage Volumes

Figure 4:
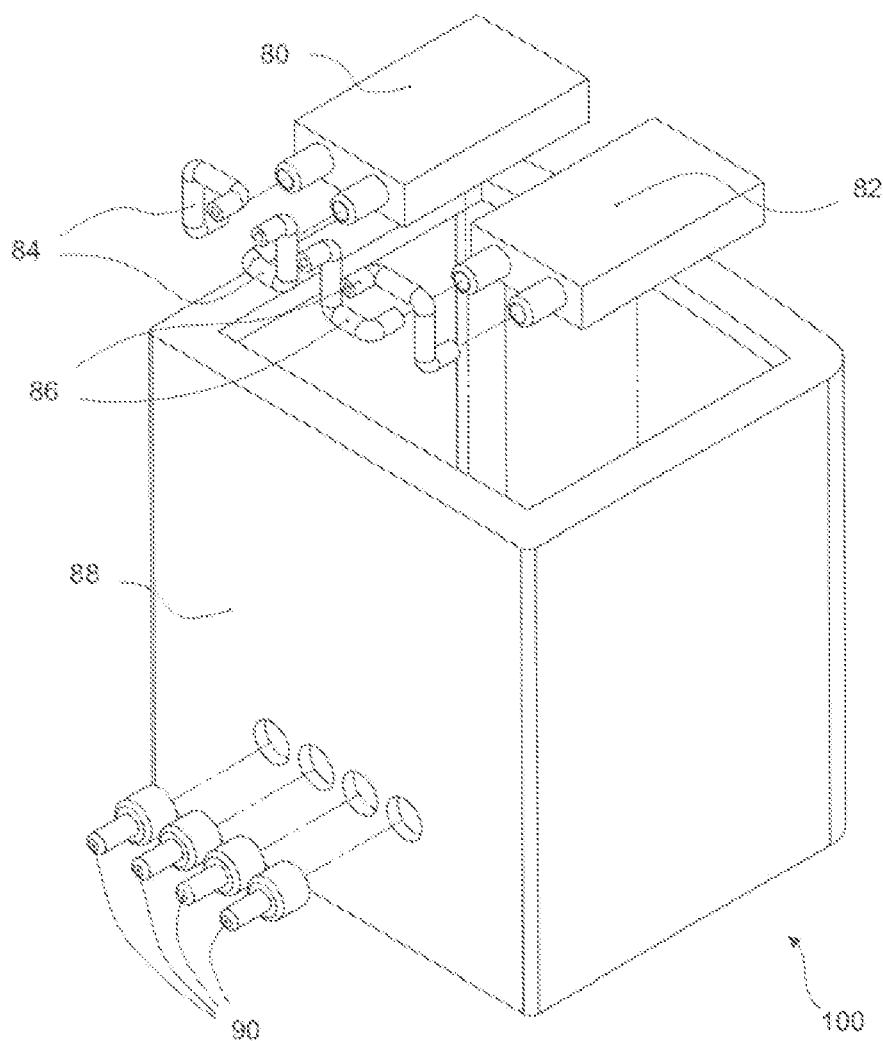
FIG. 4 is an exploded view of one configuration of the temperature-controlled container.

Referring to FIG. 1, an example of a PCM storage volume or tank is shown generally at 50. The thermal energy storage of the dynamic temperature regulating device 110 is through a PCM, encapsulated within at least one PCM block 12. In the examples shown herein a plurality of PCM blocks 12 are encased within an exterior enclosure 14 and sealed with a watertight lid 10. The exterior hose connections 16, 17 acting as the inlet and outlet, are located on opposite ends of the enclosure 14 and are preferably at two different heights; towards the top and bottom of the enclosure 14 respectively. As shown herein the upper connection is 16 and the lower connection is 17. The enclosure 14 is filled with a working heat-exchange fluid thereby preferably immersing the PCM blocks 12 completely. This working heat-exchange fluid allows thermal energy to be exchanged between the PCM blocks and the temperature-controlled container 100 (FIG. 4). By separating the inlet and outlet 16, 17 mixing of the working heat-exchange fluid is enhanced which promotes better heat exchange between the working heat-exchange fluid and the PCM blocks 12. Furthermore, by placing the inlet and outlet 16, 17 at different heights, heated working heat-exchange fluid can preferably be drawn from the top where it is most likely to reside, and similarly, cold working heat-exchange fluid can be preferably drawn from the bottom—enhancing the overall effectiveness. Preferably, one or more of these PCM storage volumes or tanks 50 (FIG. 1) is utilized with a hot PCM to act as a passive heat source, and one or more of these PCM storage volumes or tanks 50 (FIG. 1) is utilized with a cold PCM to act as a passive heat sink.

Alternate PCM Storage Volumes

Figure 10:
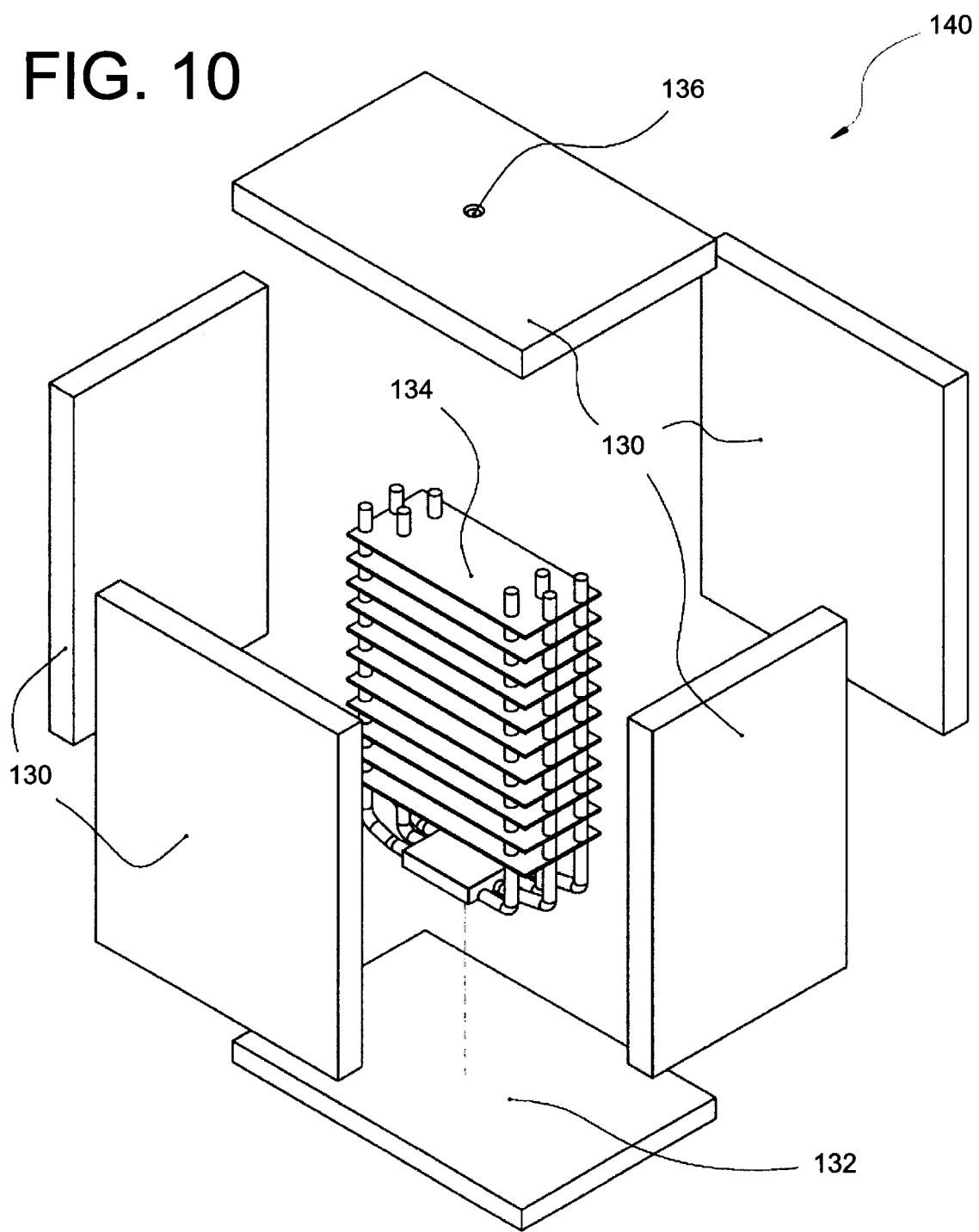
FIG. 10 is an exploded view of an alternate configuration of the Phase Change Material storage volume utilized in the dynamic temperature regulation device.
Figure 11:
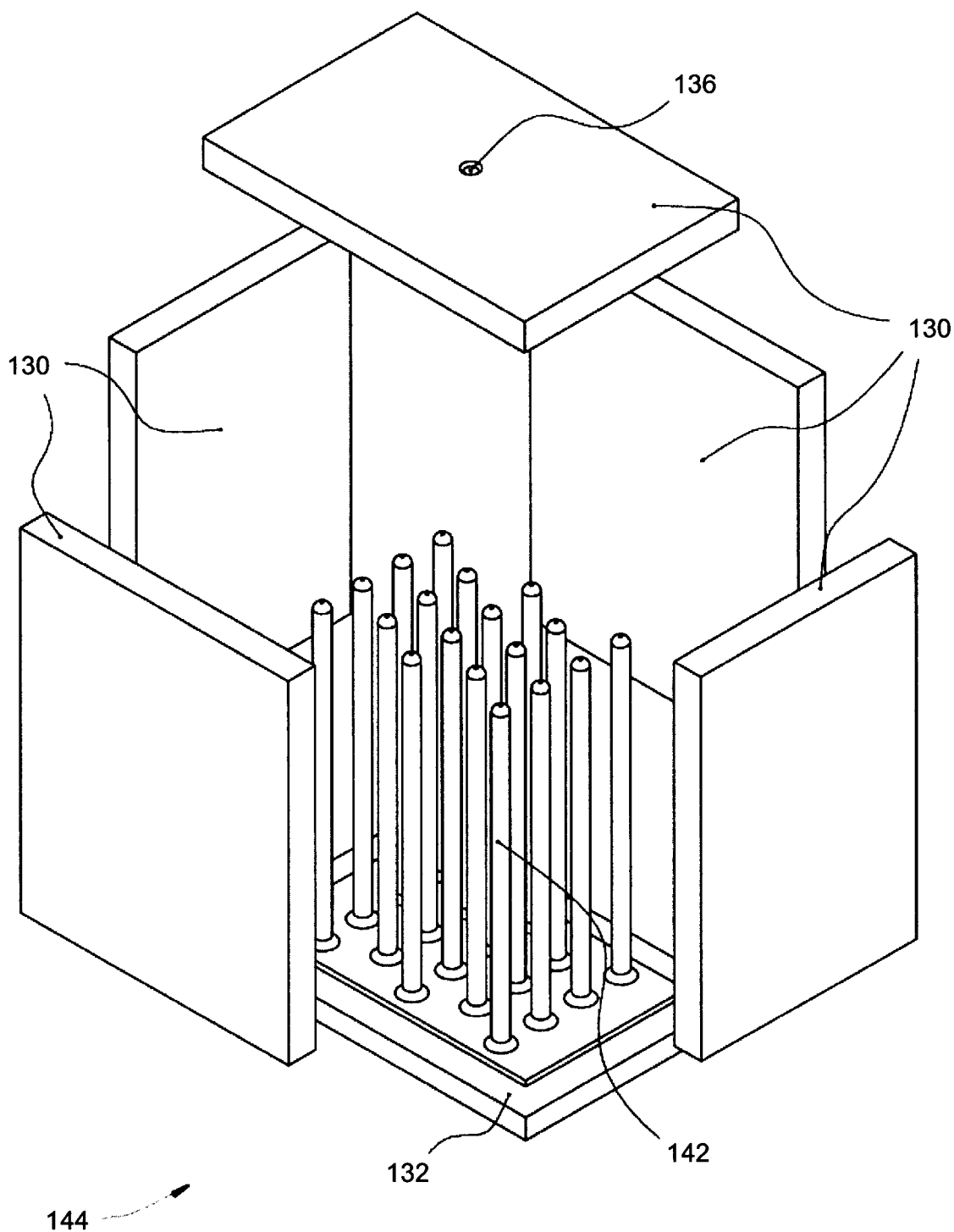
FIG. 11 is an exploded view of another alternate configuration of the Phase Change Material storage volume utilized in the dynamic temperature regulating device.
Figure 12:
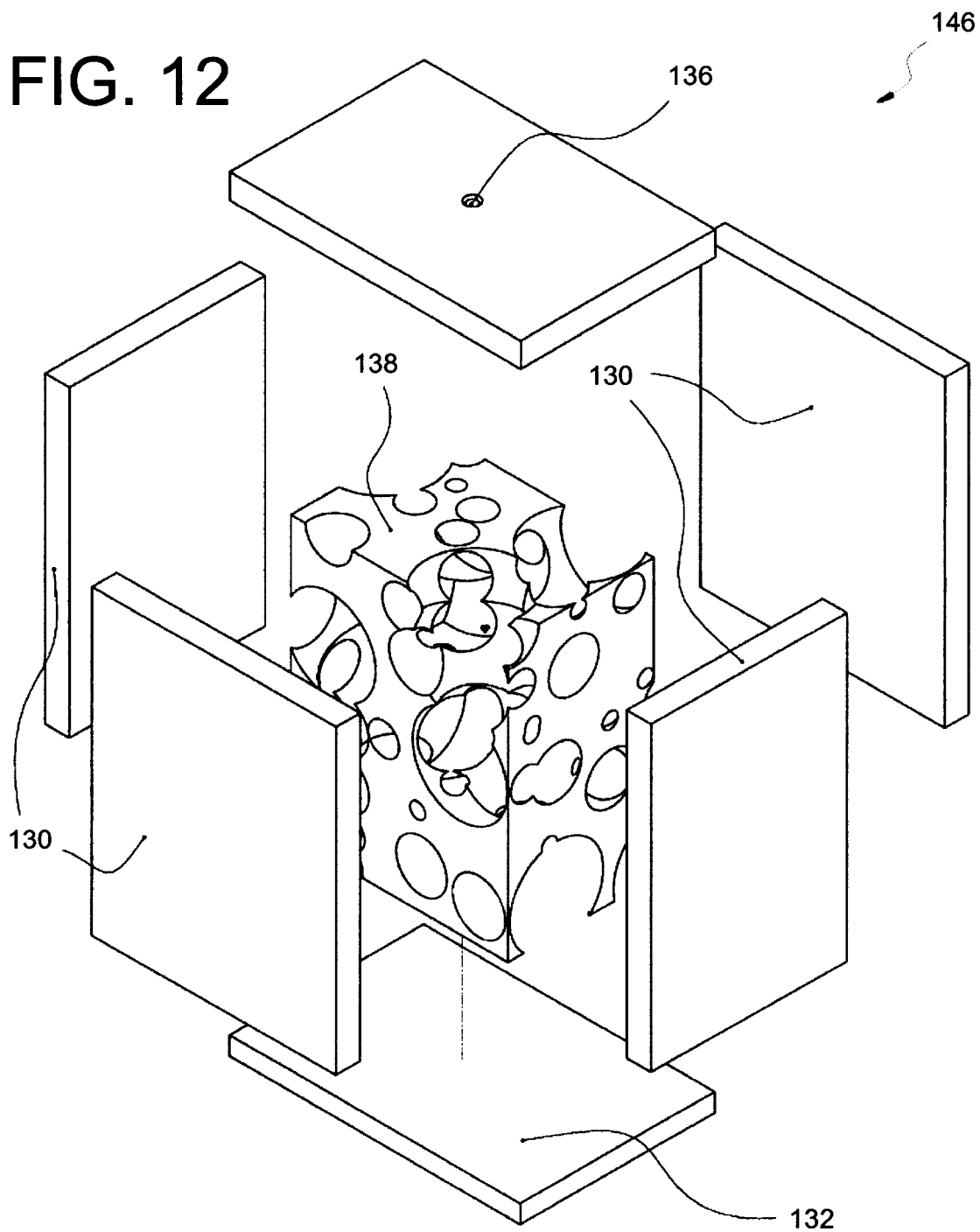
FIG. 12 is an exploded view of another alternate configuration of the Phase Change Material storage volume utilized in the dynamic temperature regulating device.

Referring to FIG. 10, FIG. 11 and FIG. 12, alternate configurations of a PCM storage volume or tank is shown generally in 140, 144 and 146. In all configurations, the thermal energy storage of the dynamic temperature regulating device 170 is through a PCM tank, which encapsulates the PCM within the housing 130, 132. While the PCM configuration in the embodiment 50 (FIG. 1) utilizes a plurality of internal PCM blocks 12 which preferably would remain submerged in the heat-exchange fluid in the enclosure 14 (FIG. 1), the configuration shown in 140, 144 and 146 encapsulate the PCM through the sealed, watertight housing 130, 132, without the need of heat-exchange fluid to transfer the heat to and from the PCM. The panels 130 will preferably utilize a thermally insulating material, or may be vacuum insulated, to reduce thermal energy losses from the PCM. This sealed encapsulation 130, 132 eliminates the need of the internal individual PCM blocks 12 and eliminates the requirement of filling the PCM storage tank with a working heat-exchange fluid. The heat transfer to and from the PCM occurs via one or more housing heat transfer medium 132. The housing heat transfer medium 132 is a thermally conductive material (material that easily transfers heat). In one embodiment it could be a plate. The heat exchange between the encapsulated PCM and the housing heat transfer medium 132 in configurations 140, 144 and 146 could be augmented using heat transfer enhancement devices, which include at least one or a plurality of, embedded heat pipes and/or thermally conductive materials (for example, metal fins), in different configurations. In addition, a combination of heat transfer enhancement devices may also be used. One possible configuration of thermally conductive material in the form of fins 134 is shown in 140, one possible configuration of heat pipes 142 is shown in 144, and one possible configuration of thermally conductive material in the form of a porous medium 138 is shown in 146. As such, the heat transfer fins 134, the heat pipes 142 and the porous medium 138 will be thermally connected to the housing heat transfer medium 132. The housing heat transfer medium will preferably be highly thermally conductive (material that can quickly and easily transfer heat). By implementing 132, 134, 138 and 142 with materials that promote heat transfer, the overall effectiveness is enhanced. A specific advantage of these configurations 140, 144, 144 allows the PCM block to remain sealed, reducing the potential of leaks, while maximizing the amount of stored PCM by eliminating the need for an internal heat-exchange fluid. One or more vented port(s) 136 as presented in 140, 144 and 146, provides both internal access to the PCM to add or remove PCM in the container, and reduces potential pressure as the PCM expands and contracts during heating/cooling.

PCM Heat Transfer Exchanger

Figure 13:
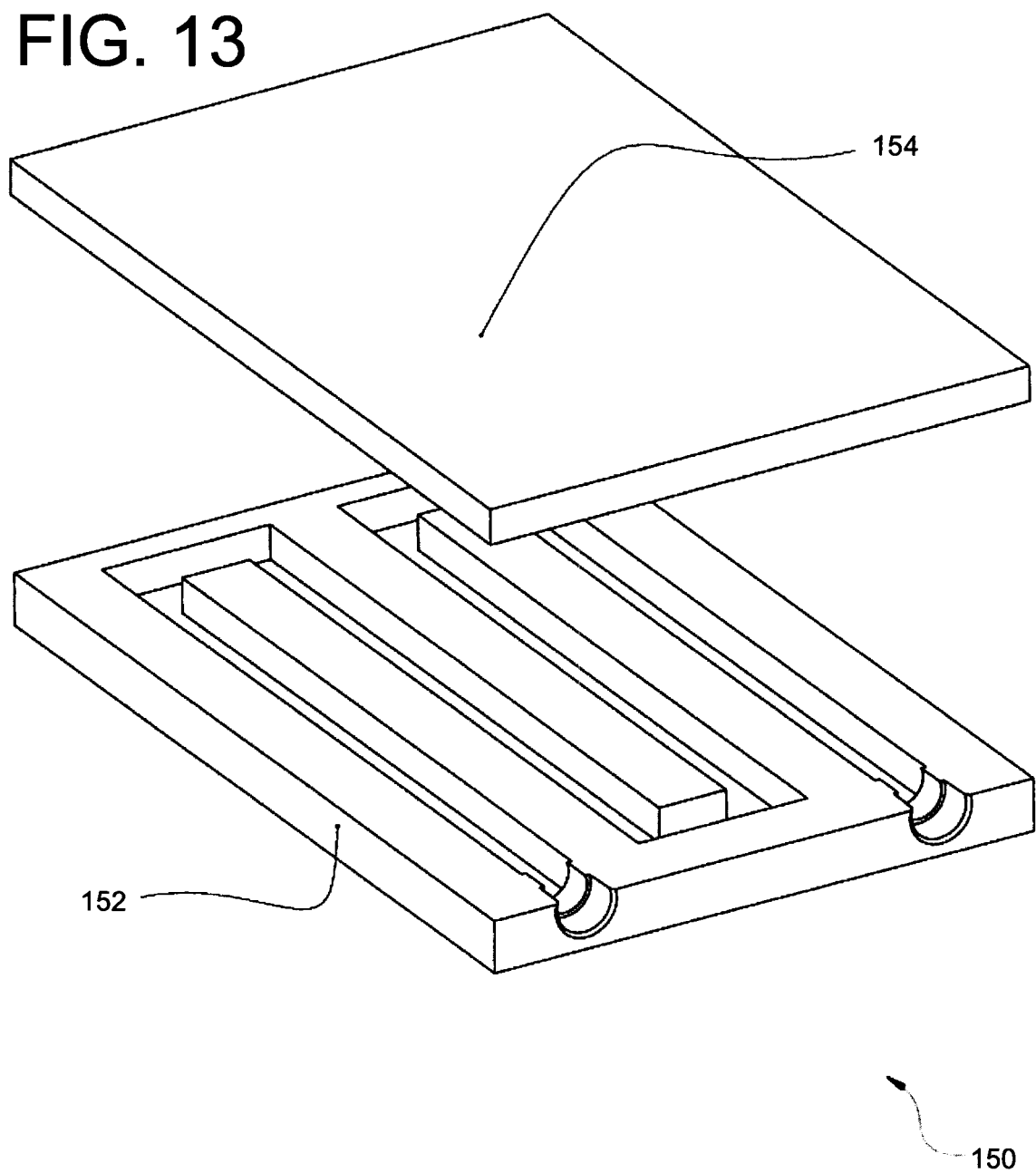
FIG. 13 is an exploded view of a configuration of an integral heat transfer exchanger configured to be coupled with the Phase Change Material storage volume embodiments shown in FIG. 10, FIG. 11 and FIG. 12.
Figure 14:
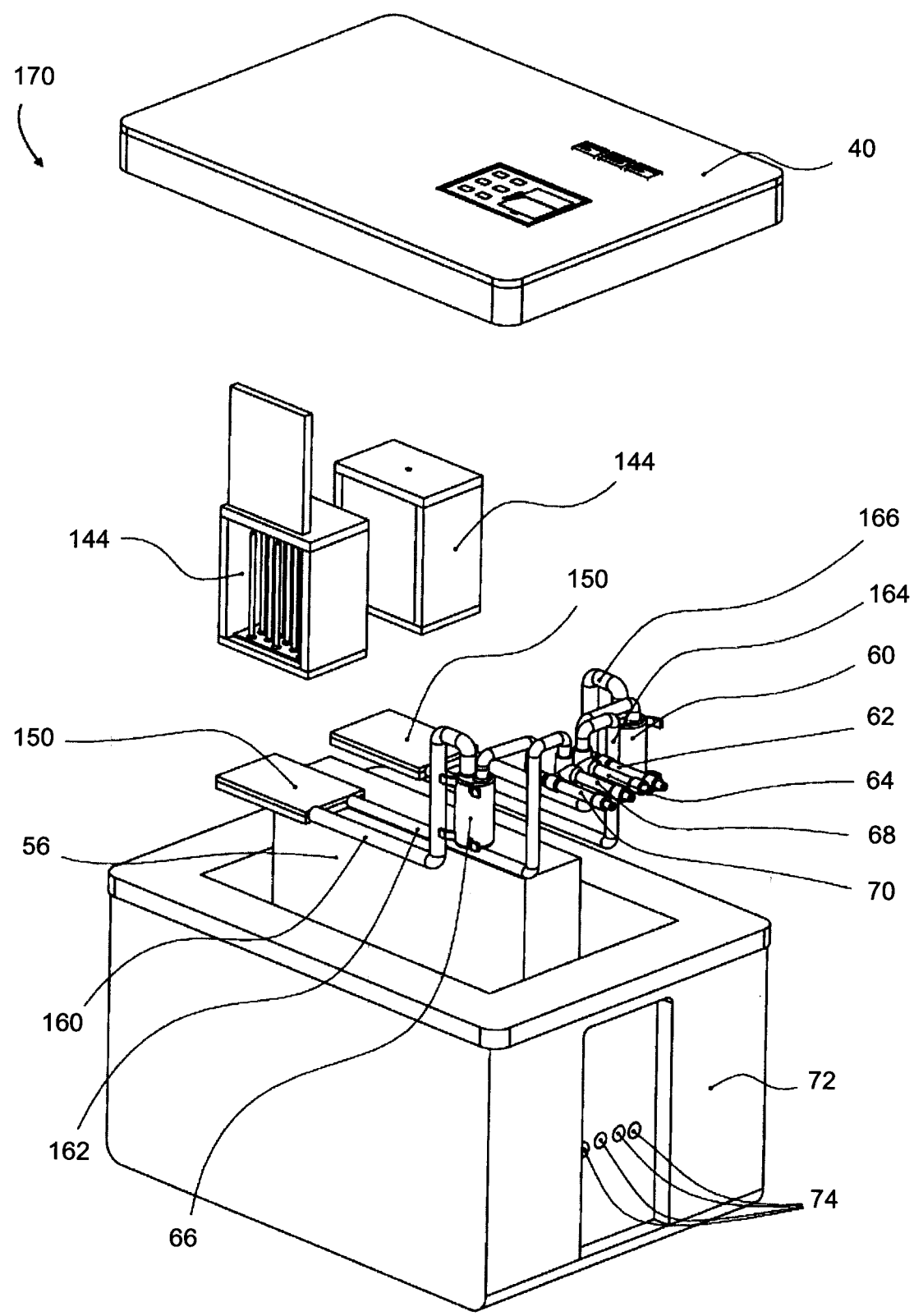
FIG. 14 is an exploded view of one embodiment of the temperature controller system, including the PCMs, electronic components, plumbing and fluid moving devices, that demonstrates a potential implementation of the Phase Change Material storage volume embodiments shown in FIG. 10, FIG. 11, and FIG. 12.

Referring to FIG. 13, a potential configuration of a heat transfer element 150 is shown, which could be used with configurations 140, 144, 146 to exchange heat with the housing heat transfer medium 132. The heat transfer element 150 is in thermal communication with PCM storage volumes (140, 144, 146). In this embodiment, the heat transfer element 150 is in thermal contact with the housing heat transfer medium 132. To facilitate the heat transfer to and from one or more of the PCM storage tanks 140, 144, 146, without the use of a working heat-exchange fluid, one or more of the heat transfer element(s) 150 would be used. In one embodiment, the heat transfer element 150 could be a solid plate. In another embodiment, it could be comprised of at least two elements 152 and 154, one or both having one or more grooves, which could form one or more channels to house a working heat exchange fluid (see FIG. 13). This working heat-exchange fluid may be circulated via fluid moving devices 60 and 66 through the channel depicted in 152. A serpentine channel is shown to promote heat transfer, improving effectiveness. As shown in FIG. 14, in one embodiment, the heat transfer element 150, would preferably remain fixed within the insulated container 72.

Detachable PCM-Contained Volumes

Figure 15:
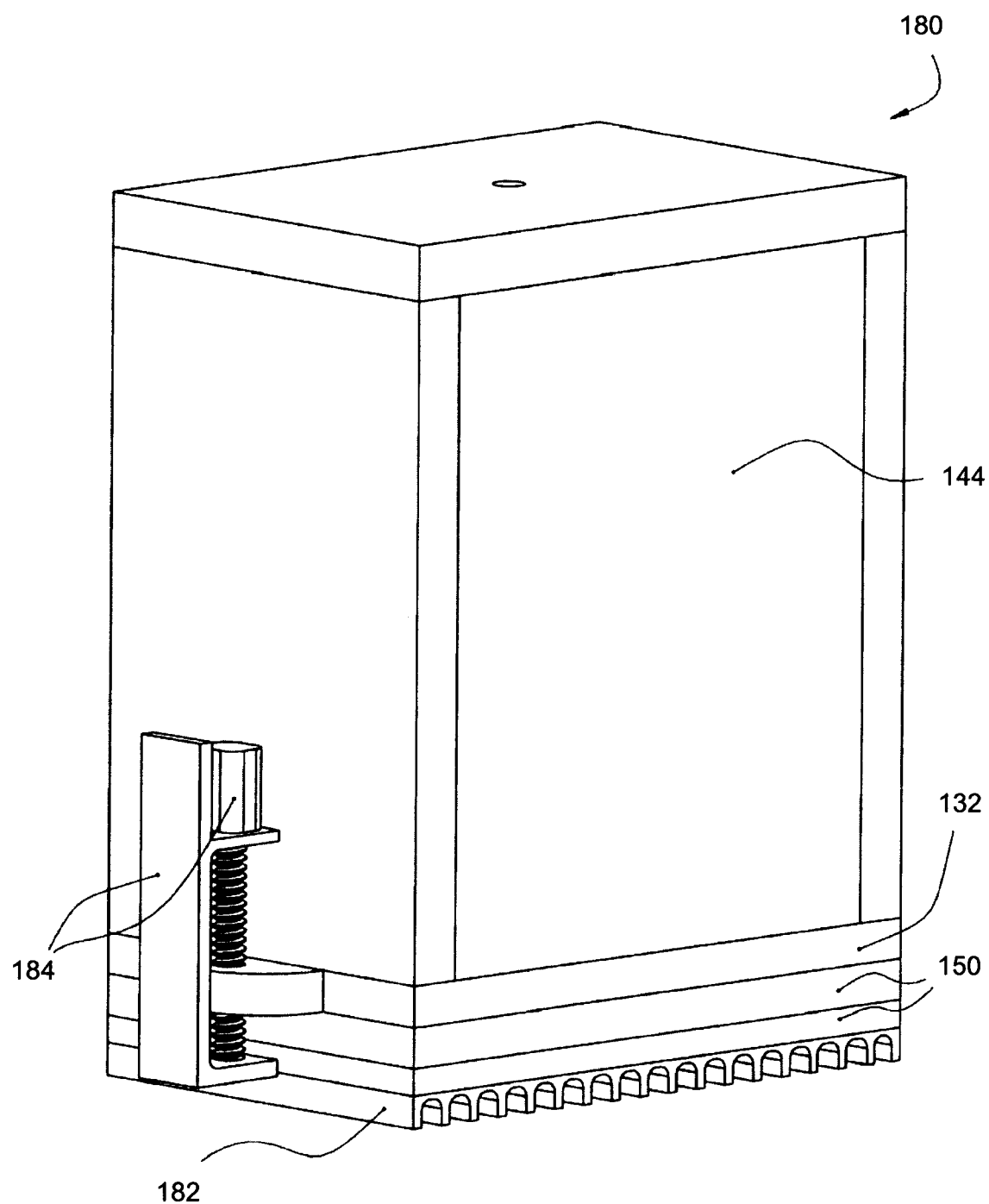
FIG. 15 is a perspective view showing one configuration when the housing heat transfer medium is in thermal communication with the heat transfer element.
Figure 16:
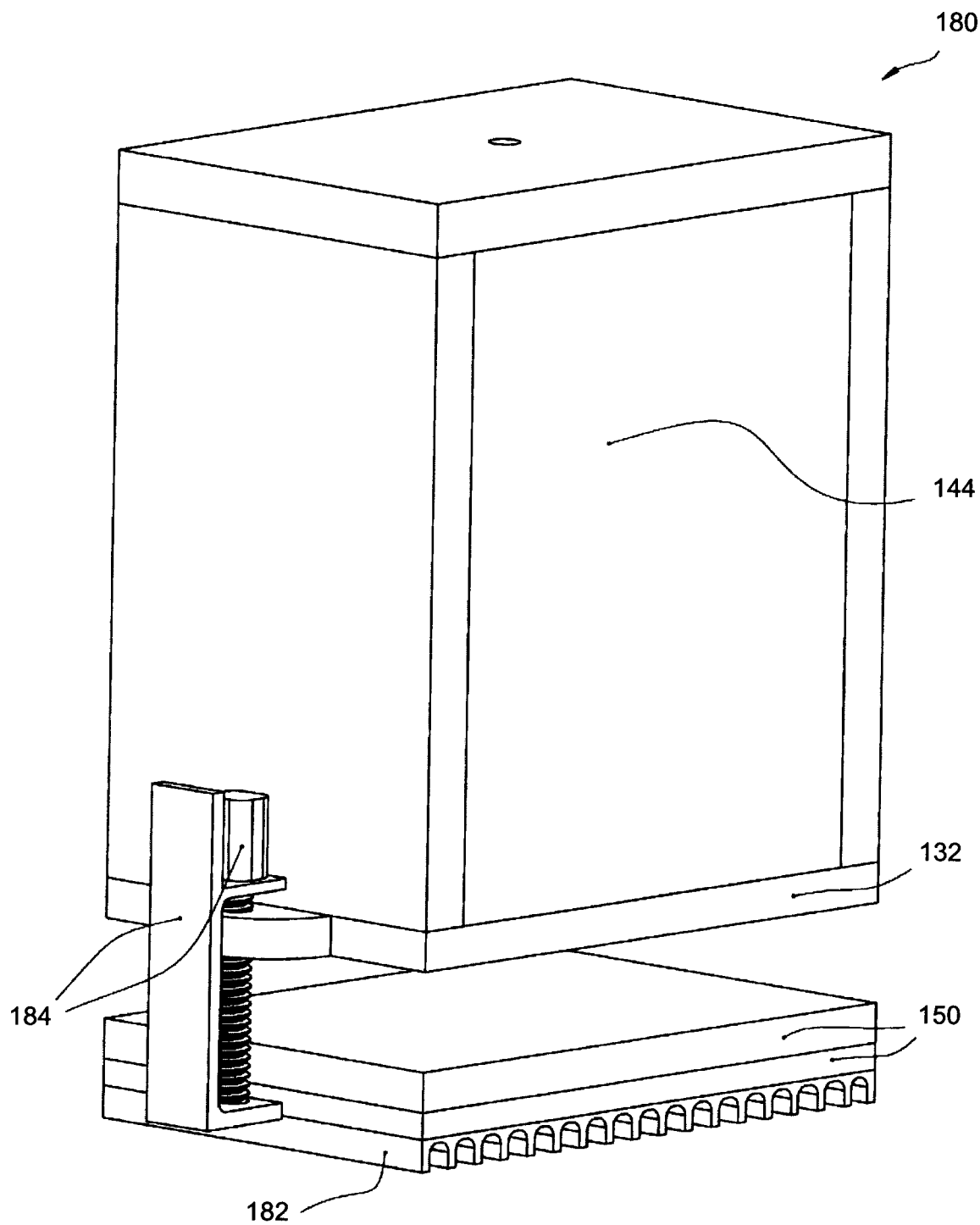
FIG. 16 is a perspective view showing one configuration when the housing heat transfer medium is not in thermal communication with the heat transfer element.

It will be appreciated by those skilled in the art that the PCM storage volumes described above could be used in a self-contained detachable thermal energy storage system, akin to a battery. Examples of the self-contained thermal energy storage system is shown in FIGS. 15 and 16 which utilize previously discussed components 144 and 150. It should be noted that while the storage volume 144 is shown in FIG. 15 and FIG. 16, PCM storage volumes 140 and 146 may also be used.

As previously described, each storage volume, 140, 144, 146 includes a sealed housing 130, 132 defining a volume having a selective portion being a housing heat transfer medium; a phase change material in the volume of the sealed housing; and a heat transfer element 150 operably attachable to and in thermal communication with the housing heat transfer medium.

The heat transfer medium may have a number of different configurations. In the embodiment shown in FIG. 14, the selective thermal communication is achieved through the control of the fluid moving devices 60, 66, transferring thermal energy by moving heat transfer fluid. Whereas, in the embodiment shown in FIG. 15 and FIG. 16, the selective thermal communication is achieved by the thermal contact and disconnect between the housing heat transfer medium 132 of the PCM storage volume 144 and the heat transfer element 150, which controls the heat transfer. As shown in FIG. 15 and FIG. 16, a linear actuator 184 is used as a mean to facilitate the thermal connection and disconnection. In FIG. 15, the actuator thermally connected the housing heat transfer medium 132 and the heat transfer element 150 by bringing the two parts together. In FIG. 16, the actuator thermally disconnected the housing heat transfer medium 132 and the heat transfer element 150 by moving the two parts away.

It should be noted, that in contrast to the embodiment show in FIG. 14, the heat transfer element 150 in these embodiments 180 would require no internal heat transfer fluid and instead would utilize a heat transfer enhancement device 182. This would eliminate, in this embodiment, the requirement for external components, including fluid moving devices 60, 66 and would allow for a self-contained detachable unit. As shown, the heat transfer enhancement device 182 may utilize fins.

Electronic Housing and Components

The entire dynamic temperature regulating device 110 is preferably controlled and monitored through a single board computer, referred to as a system on chip (SoC) 30. The SoC 30 is preferably running a custom program (described in greater detail in FIG. 9). Multiple, independent sensors (not shown) are operably connected to a junction block 28 to actively monitor temperature and simultaneously transmit signals. Preferably the signals are digital signals in the form of temperature values to the SoC 30. The sensor locations may include: the working heat-exchange fluid temperature at the exterior hose connections 16, 17 of the PCM storage volumes 50 (FIG. 1), the ambient air temperature inside and outside the insulated container 72 housing the PCMs (FIG. 3), and the temperatures at multiple locations within the temperature-controlled container 100 (FIG. 4). The number of sensors may be expanded to provide a greater resolution of the temperature field within different components of the system, depending on the intended application and/or to monitor other variables as needed. A relay board 26 is preferably used to control the on-board electro-mechanical components, including but not limited to the fluid moving devices 60, 66 to move the working heat-exchange fluids. Preferably, this includes a pump 60, 66 for the PCM heat source and heat sink storage volume 50, 52 (FIG. 1). This may be expanded however to include additional fluid moving devices depending on the intended temperature-controlled application. The fluid moving devices may be pumps or fans depending on whether the working heat-exchange fluid is a liquid or gas respectively. A rechargeable battery pack 32 is preferably utilized to power any onboard electronic components. Preferably, the electronic components 26, 28, 30, 32 are housed within an enclosure 34 that is sealed with a lid 20. Embedded within the lid 20 are preferably multiple displays 22, 24 to provide user-feedback and accept user-input. Displays 22 may be used to provide critical system information to the user, including but not limited to, the heat source volume temperature(s), the heat sink volume temperature(s), the user defined target temperature, the current system status and the temperature of the temperature-controlled container 100 (FIG. 4). A display with integrated touchscreen 24 may be utilized to convey an expanded set of information to the user, such as a time history plot of the temperature-controlled container 100 (FIG. 4). The touchscreen 24 may be used to allow the user to control the electric components of the dynamic temperature regulating device, including but not limited to, adjusting the target temperatures, dismissing alerts, manually controlling the relays 26, and running preprogrammed temperature ramps (discussed in greater detail with the software flowchart, FIG. 9). The system information and user inputs may also be provided remotely via Wi-Fi and/or cellular signals using digital and/or cellular devices.

Temperature-Controller System

In the embodiment shown herein the dynamic temperature regulating device 110 is housed within an insulated container 72. This container 72 houses a plurality of PCM blocks 12. As shown herein the PCM storage volumes are identified as 50 and 52. In the embodiment shown herein, PCM storage volume 50 is one of a heat source and a heat sink and PCM storage volume 52 is the other of a heat sink and heat source. It will be appreciated by those skilled in the art that two or more PCM storage volumes 50, 52 may be used. PCM storage volume 50 and 52 are separated by insulation 56 along the sides and insulated along the top with removable insulation top covers 42. The exterior hose connections 16, 17 of the PCM storage volume 50, 52 are connected by tubing 44, 46, 48, 54. If the PCM storage volume 50, 52 is a heat source, the inlet and outlet exterior hose connections 16, 17 are from the bottom and top of the PCM storage volume 50, 52, respectively. If the PCM storage volume 50, 52 is a heat sink, the inlet and outlet exterior hose connections 16, 17 are from the top and bottom of the PCM storage volume 50, 52, respectively. As such, if the PCM storage volume 50 is a heat sink, then the tube 44 may be connected to the outlet exterior hose connections 16, 17 and the tube 54 may be connected to the inlet exterior hose connections 16, 17. And, if the PCM storage volume 52 is a heat source, then the tube 48 may be connected to the exterior hose connection outlet 16, 17 and the tube 46 may be connected to the inlet exterior hose connections 16, 17. The tubes 44 and 46 are preferably connected between the exterior hose connection 16, 17 of the PCM storage volume 50, 52 and fluid moving devices 60, 66. These fluid moving devices 60, 66 are preferably used to transfer the working heat-exchange fluid out of the PCM storage volume 50, 52 and preferably through quick-connection valves with auto-shutoff 62, 70. The tubes 48 and 54 are connected between the exterior hose connections 16, 17 and preferably through quick-connection valves with auto-shutoff 64, 68. The connections 62, 64, 68, 70, which exit the insulated container 72 through holes 74 will preferably require no tools to operate, provide a water and air-tight connection, and self-seal when disconnected. The connections 62, 64, 68, 70 will preferably connect external tubing 102, 104, 106, 108 to the temperature-controlled container 100 (FIG. 4). The electronic components are preferably housed in the lid 40 for the insulated container 72 and will preferably be hinged to allow access to the internal components within the insulated container 72. Fluid moving devices 60 and 66 may be connected to either the outlet or inlet of the PCM storage volume 50, 52.

Figure 6:
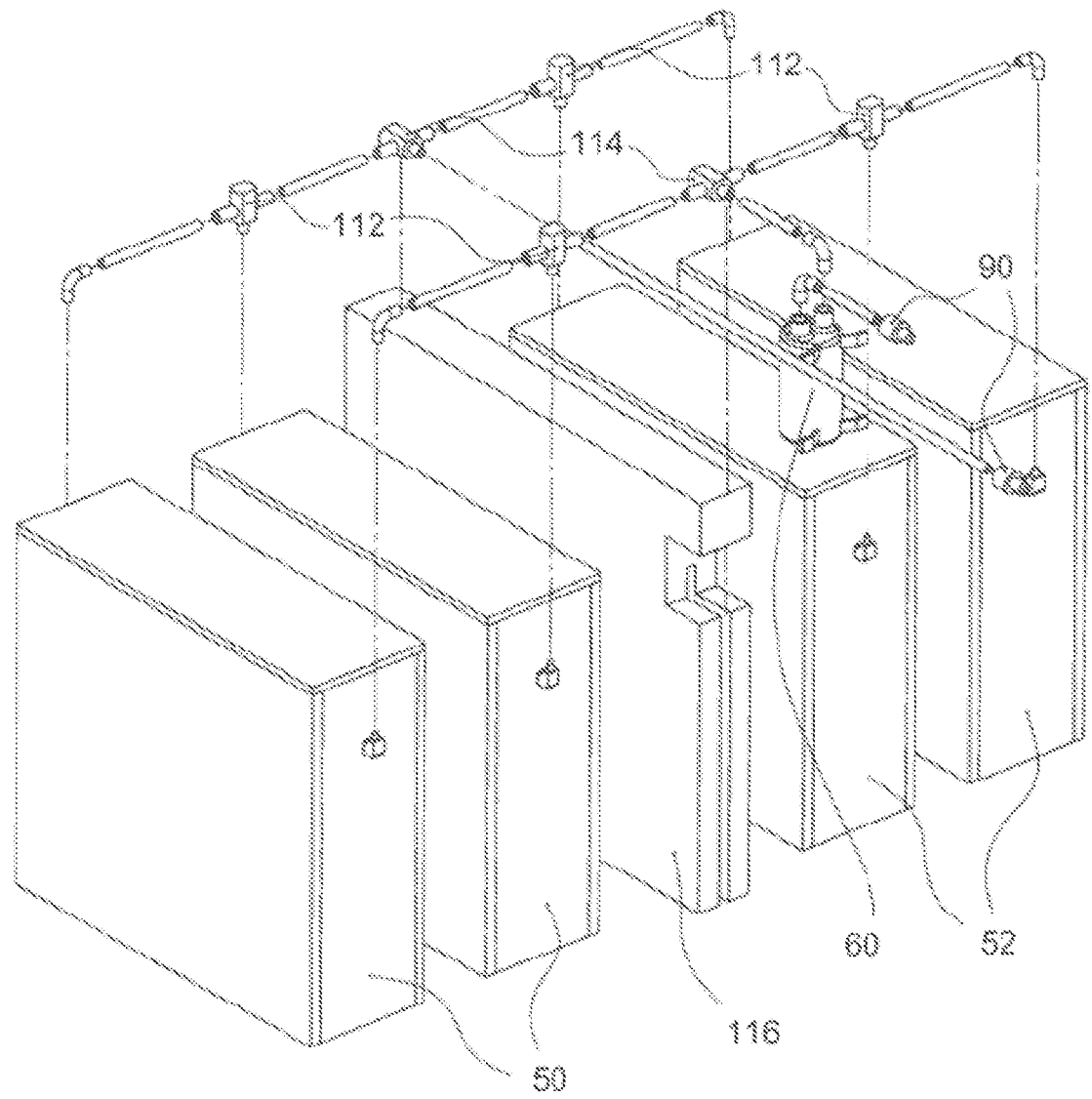
FIG. 6 is an exploded view of one embodiment where the heat source is a plurality of heat source volumes and the heat sink is a plurality of heat sink volumes.

One embodiment where the heat source is a plurality of heat source volumes and the heat sink is a plurality of heat sink volumes is presented in FIG. 6. While not shown, preferably, a comparable external enclosure 72, electronic housing 40 and electronic components 20-32 would be used, as shown in the embodiment in FIG. 2. and FIG. 3. In this embodiment FIG. 6, preferably multiple heat source volumes 50 and preferably multiple heat sink volumes 52 are implemented. The multiple volumes 50, 52 allow for greater heat storage capacity and would extend the working time of the dynamic temperature regulating device. In this embodiment FIG. 6, preferably electromechanical actuated three-way valves, herein referred to as three-way valves 112 would allow manual and/or software control of the working heat-exchange fluid between the multiple heat source volumes 50 and heat sink volumes 52. Additional three-way valves 114 would preferably enable manual and/or software control of the heat-exchange fluid between either heat source 50 and heat sink volume 52. Preferably, a single fluid moving device 60 would move the working heat-exchange fluid through the entire system. The inlet and outlet of the system FIG. 6, would preferably include quick-connect fittings with auto-shutoff valves 90. Insulation 116 would preferably be included between the heat source volume 50 and heat sink volume 52 to minimize heat transfer between the heat storage volumes 50, 52.

Another embodiment of the temperature-controller system 170 is presented in FIG. 14, where the heat source and heat sink are a plurality of PCM tanks 144. It should be noted that the plurality of PCM tanks, while shown 144, may be interchangeable with the configuration 140 presented in FIG. 10 and the configuration 146 presented in FIG. 12. In this embodiment FIG. 14, the heat transfer element 150, attached pipe network, 160, 162, 164, 166, and fluid moving devices 60 and 66, would preferably be: fixed within the insulated container 72, filled with a working heat-exchange fluid and sealed to prevent leaks. The PCM storage tanks 144 would be detachable from the insulated container 72 and would be insulated with an internal insulation 56. Heat transfer to and from the PCM storage tanks 144 would be through the heat transfer medium 132 and heat transfer element 150. The electronic control system 40, and the connections 62, 64, 68, 70, which exit the insulated container 72 through holes 74 would preferably remain unchanged from embodiment 110 presented in FIG. 3 and FIG. 5.

Temperature-Controlled Container

In the embodiment shown herein the dynamic temperature regulating device 110 (FIG. 3) will need to be operably connected to the intended temperature-controlled container a preferred embodiment of which is shown in FIG. 4 at 100 and is described hereafter. Quick-connection with auto-shutoff valves 90 allow for easy connection/disconnection between the dynamic temperature regulating device 110 and preferred temperature-controlled container 100. A preferably insulated exterior housing 88 holds the heat exchangers 80, 82 and tubing 84, 86. The working heat-exchange fluid is transferred by the fluid moving devices 60, 66 and circulated through the heat exchangers 80, 82, with one heat exchanger acting as the heat sink, and the other acting as the heat source. As such, depending on the intended application, heat can either be added to the temperature-controlled container 100 or drawn away from the temperature-controlled container 100. The working heat-exchange fluid in PCM storage volumes 50 and 52 are in flow communication with the heat exchangers 80 and 82.

Figure 7:
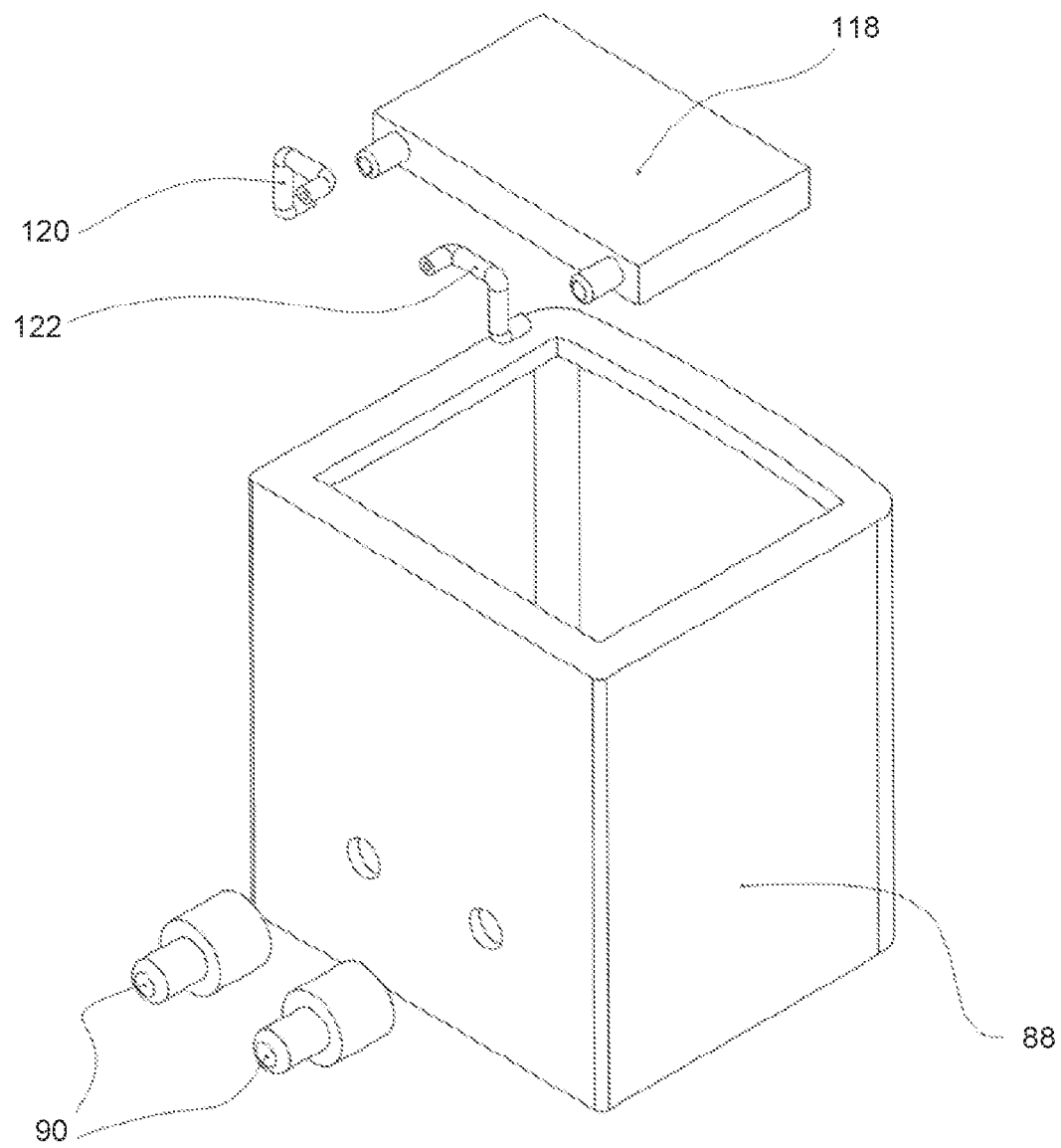
FIG. 7 is an exploded view of one embodiment wherein the temperature-controlled container includes one heat exchanger and the same working heat-exchange fluid is in flow communication with the heat source volume and the heat sink volume.

One embodiment of the temperature-controlled container, compatible with the dynamic temperature regulating device FIG. 6, is shown in FIG. 7. In this embodiment, a single heat exchanger 118 and tubing 120, 122 is in flow communication with the working heat-exchange fluid. With the addition of three-way valves 114 and a single fluid moving device 60, in the embodiment shown in FIG. 6, the same working heat-exchange fluid is in flow communication through all heat source and sink volumes 50, 52. As such, only a singular inlet and outlet are required in the temperature-controlled container FIG. 7. The heat exchanger 118 will function as both a heat source and a heat sink, depending on the supplied working heat-exchange fluid. Quick-connections with auto-shutoff valves 90 allow for easy connection/disconnection between the dynamic temperature regulating device FIG. 6 and temperature-controlled container FIG. 7.

Figure 8:
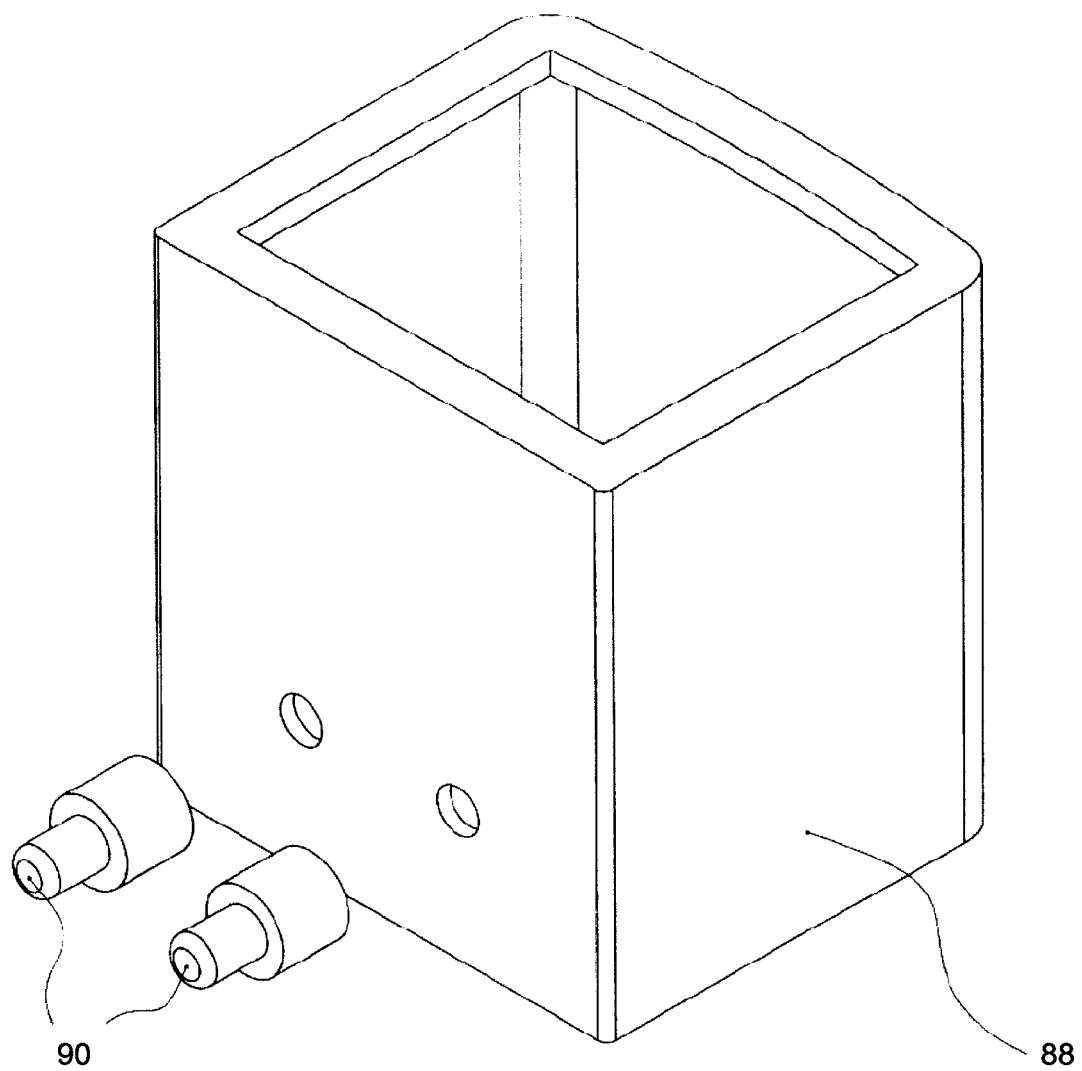
FIG. 8 is an exploded view of one embodiment wherein the working heat-exchange fluid is the same fluid as inside the temperature-controlled container.

Another embodiment of the temperature-controlled container is shown in FIG. 8. Similar to the embodiment shown in FIG. 7, this configuration FIG. 8 only requires a single inlet and outlet and is compatible with the dynamic temperature regulating device shown in FIG. 6. In this embodiment FIG. 8, no heat exchanger is required as the working heat-exchange fluid is in direct contact with the temperature-controlled container FIG. 8. Quick-connection with auto-shutoff valves 90 are used for the inlet and outlet of the housing 88.

Dynamic Temperature Regulating Device and Temperature-Controlled Container

Figure 5:
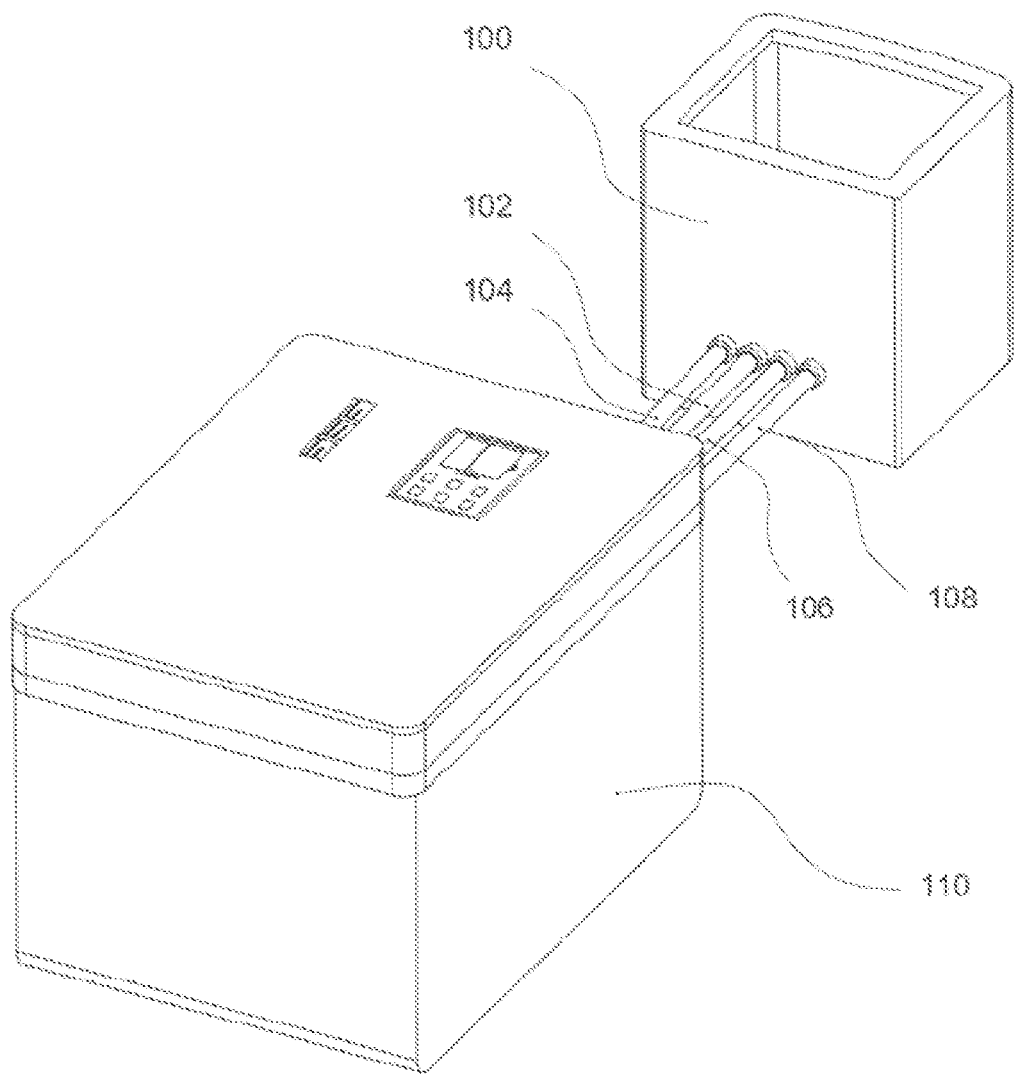
FIG. 5 is an upper perspective view of one configuration of the dynamic temperature regulating device with connections between the temperature controller and temperature-controlled container.

An embodiment of the complete system is shown in FIG. 5. The dynamic temperature controller system 110 is connected to the temperature-controlled container 100 through flexible tubing 102, 104, 106, 108, with adjacent tubes providing the supply and return lines between the PCM storage volumes 50, 52 and heat exchangers 80, 82.

Controlling Program

The electrical components of the system are preferably controlled via a system on chip (SoC). In one embodiment, the system can operate with a SoC 30 executing a custom program. The user is able to set the desired target temperature, which the system can independently respond to, and make the necessary adjustments to hold that temperature (within an interval), preferably without the need for any user intervention. The multiple sensors within the system constantly monitor the temperature and other variables as necessary, and will preferably shut off the fluid moving devices once the temperature inside the temperature-controlled container is within a target threshold of the target temperature. If the outlet temperature of the heat source or heat sink is outside a threshold that is deemed sufficient to maintain the target temperature, the system will preferably alert the user through signals, preferably displays 22, 24, and if enabled, a notification sent to remote devices such as mobile phones. The criteria for notifying the user may also include, but is not limited to, a deviation from the target temperature, a change in GPS location of the invented device, any program errors, a detected impact or high acceleration, loss of working heat-exchange fluid, or high/low humidity. The notifications may also be customized to alert the user through additional methods that include but are not limited to, an email, a page on a pager, a phone call or an in-app alert. Additional components that the system will preferably contain are a GPS, a wireless networking module, an accelerometer, a humidity sensor, and a liquid contact sensor, preferably these components are attached to the SoC 30. The program will also preferably allow the user to set predetermined temperature ramps. These temperature ramps will preferably allow the user to specify the target temperatures, the time to hold these target temperatures, and the rate of heating/cooling to reach these target temperatures. These temperature ramps may be controlled manually, or may be controlled automatically or remotely, potentially based off external sensor data, which may include temperature control based on GPS location. Once configured, the system can independently follow these temperature ramps, heating or cooling as required.

Figure 9:
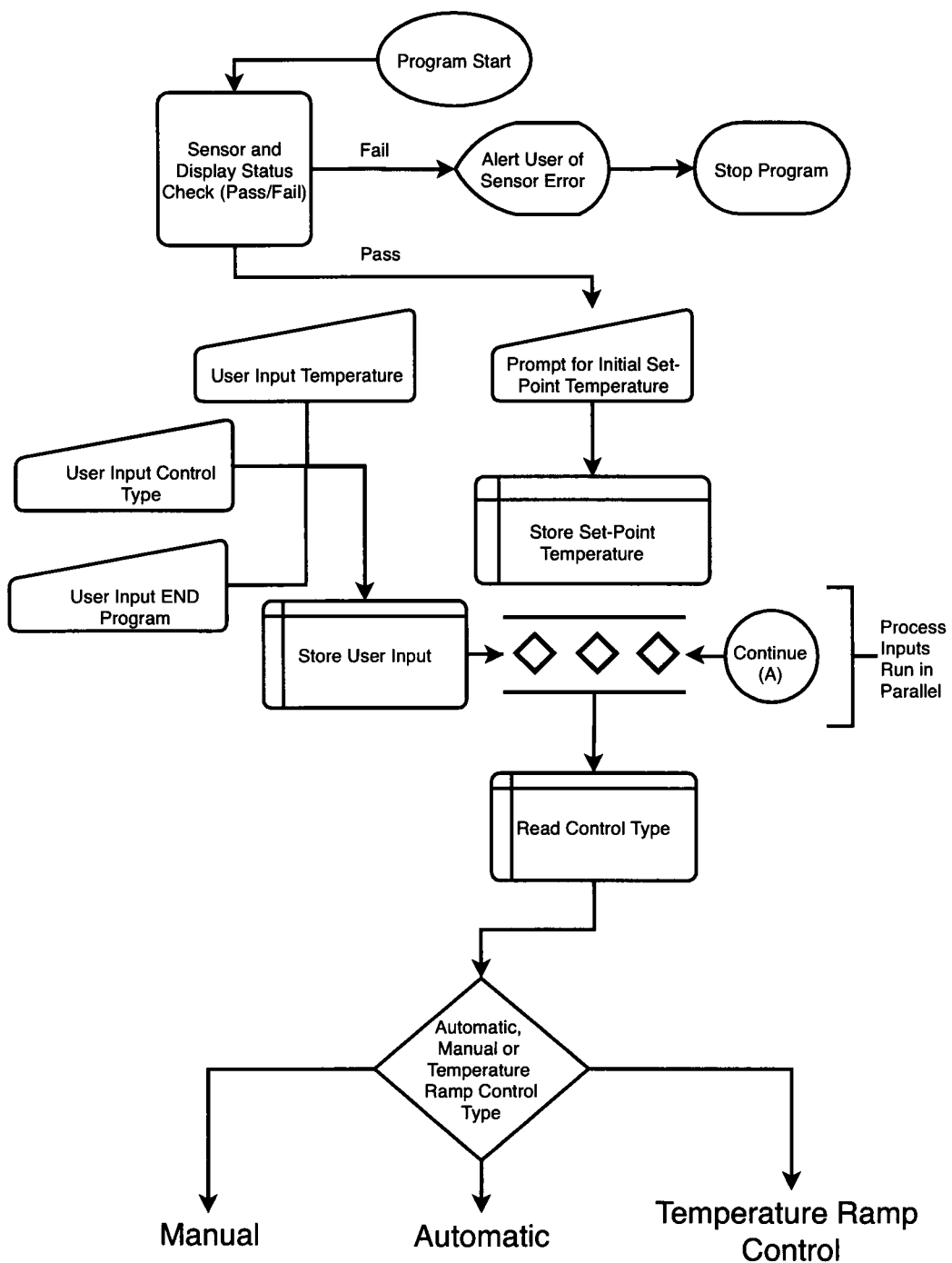
FIG. 9 is a flow chart illustrating the basic steps performed when the program controlling the system is running.
Figure 9:
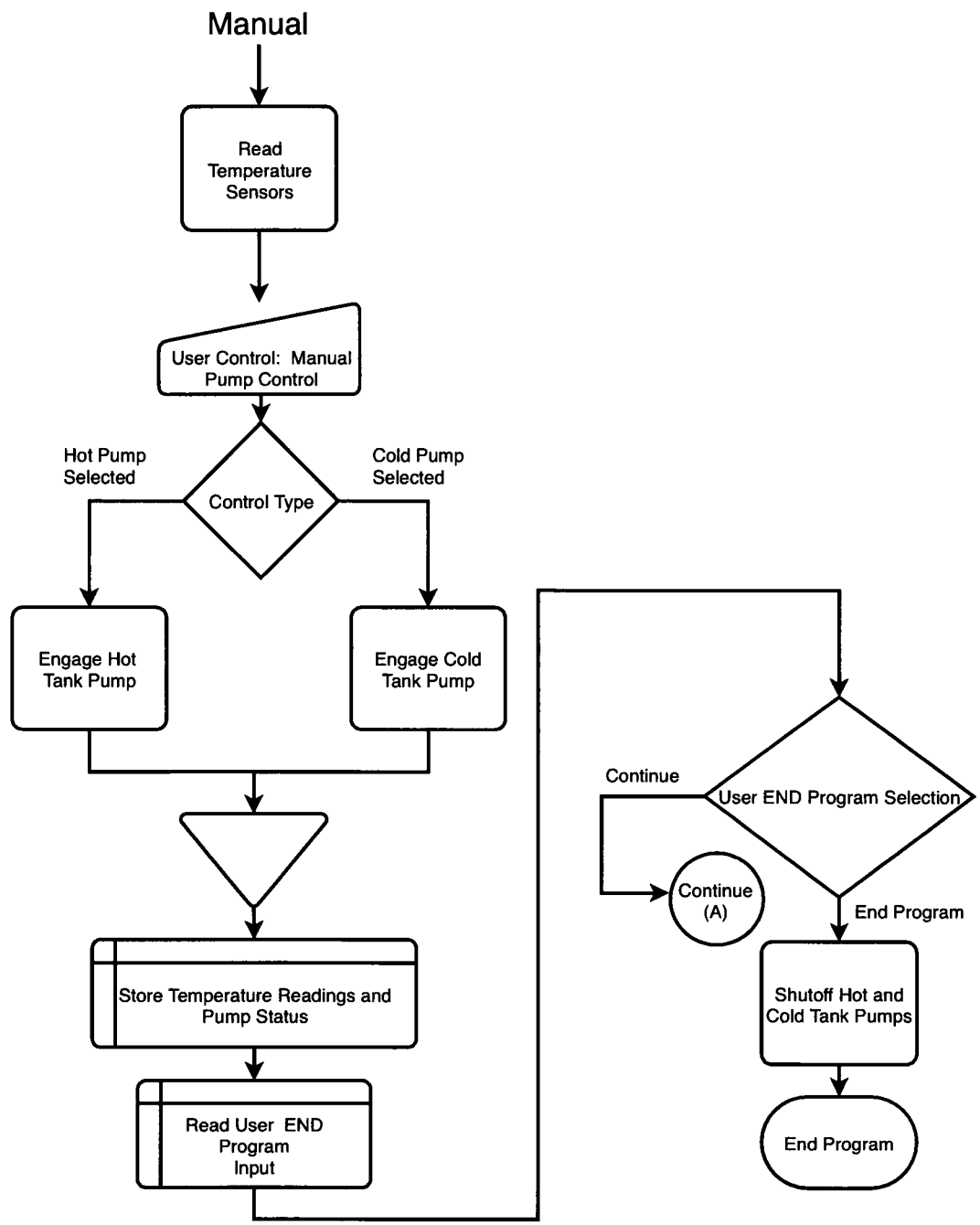
Figure 9:
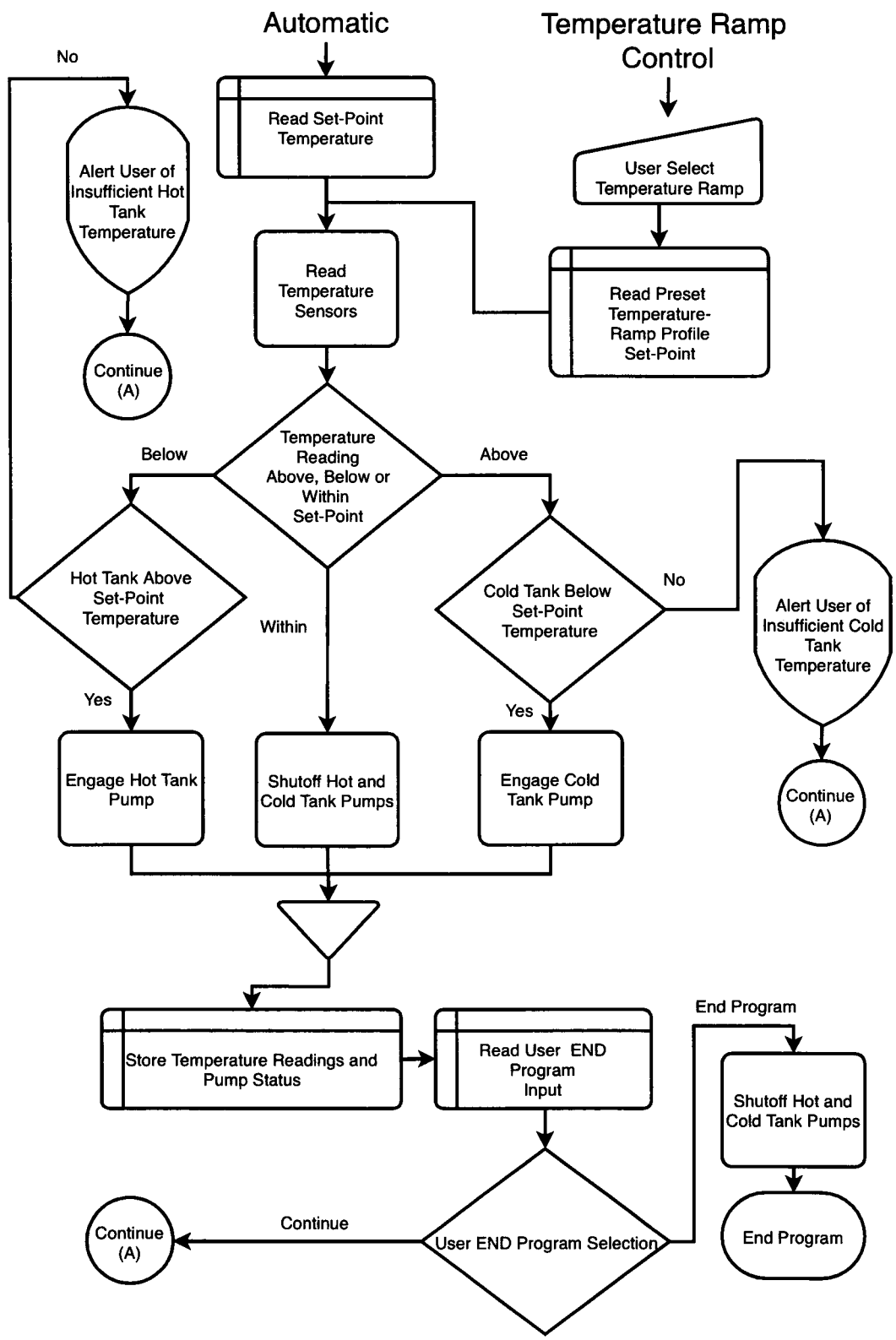

A flow chart of the general program functions is shown in FIG. 9. Upon startup, the system performs a mandatory status check, determining proper function of all integrated sensors and displays. Once successful, the main program will begin, requiring the user to input an initial target temperature. As shown herein, while the program is running, the available user input options include, but are not limited to: the target temperature, the input control type and program shut down. There are three primary input control types; manual, automatic, and temperature-ramp control. In manual mode, the temperature readings from all temperature sensors are recorded to internal memory, and all fluid movement device control is handled by the user. A user input device, preferably a keypad or touchscreen 24, allows the user to turn on the fluid moving device 60, 66 to the heat source or heat sink storage volume 50, 52. In automatic mode, the temperature from the sensors is recorded, and all fluid movement device control is handled by the software. For example, if the temperature reading is above the target temperature, the program first confirms that the heat sink temperature is below the target temperature before engaging the heat sink volume 50, 52 fluid movement device 60, 66 to cool the temperature-controlled container 100. If the heat sink volume 50, 52 temperature is above the target temperature, an alert signal is displayed indicating the need to recharge (condition) the heat sink. Conversely, if the temperature reading is below the target temperature, the program first confirms that the heat source volume 50, 52 temperature is above the target temperature before engaging the heat source volume 50, 52 fluid movement device 60, 66 to warm the temperature-controlled container 100. If the heat source volume 50, 52 temperature is below the target temperature, an alert signal is displayed indicating the need to recharge (condition) the heat source. In temperature-ramp control mode, preset temperature ramp profiles are utilized instead of the user target temperature. These temperature profiles may raise or lower the target temperature with time, providing an automatic adjustment of the temperature-controlled container 100. After reading the temperature ramp profile's current target temperature, the program utilizes the automatic pump control to determine if heating or cooling is required. If the user decides to end the program, the pumps are shut off, and the sensor data is stored to a unique file on the internal memory.

In Use

The system is designed to be portable, and require no external power input when in use. Before operating the system, several setup tasks are required for fully portable use. First, the PCMs need to be conditioned (preferably via external sources) which involves melting the heat source PCMs 12 to its liquid state, and freezing the heat sink PCM 12 to its solid state. Second, the internal battery 32 needs to be recharged. Once conditioned, the PCM storage volumes 50, 52 can be reinstalled into the insulated container 72, and reconnected to the pipe and pumping system 44, 46, 48, 52. It should be noted that while designed to be externally conditioned, the dynamic temperature regulating device could alternatively be connected to an external heat source/sink to condition the PCMs without removing them from the insulated container 72. In one embodiment to keep the operating condition of the temperature-controlled container 100 between 4 and 37 degrees Celsius, paraffin wax (approx. 50 degree Celsius melting temperature) could be used as a PCM for the heat source and ethylene glycol (approx. −12 degree Celsius) could be used as a PCM for the heat sink. Alternatively, commercially available PCMs which melt over a wide range of temperatures can be used. For example, Rubitherm® Technologies GmbH develops a range of suitable PCMs. The PCM, RT −9 HC, is suitable as a heat sink as it freezes at −9 degrees Celsius, and the PCM, RT 64 HC, is suitable as a heat source, melting at 64 degrees Celsius. It should be noted that PCMs suitable for this application are not limited to these two melting point temperatures. The primary criteria is that a PCM that melts at temperatures above the desired operating temperature range would serve as a heat source, while a PCM that freezes at temperatures below the desired operating temperature range would serve as a heat sink. This ensures that the supplied working heat-exchange fluid will be delivered to the temperature-controlled container at a suitable temperature while accounting for the heat exchange with the surroundings.

After setup, the user can run the program described in detail in the 'Controlling Program' section, and shown in FIG. 9. This program will check the necessary sensors and fluid moving devices to determine that components are functioning correctly. When the system status is confirmed, the user can set a target temperature that the dynamic temperature regulating device will maintain within the temperature-controlled container 100. This temperature control will be maintained as long as the PCMs and internal battery remain charged. At this point, the entire system FIG. 5 will be portable and ready for transportation.

Figure 17:
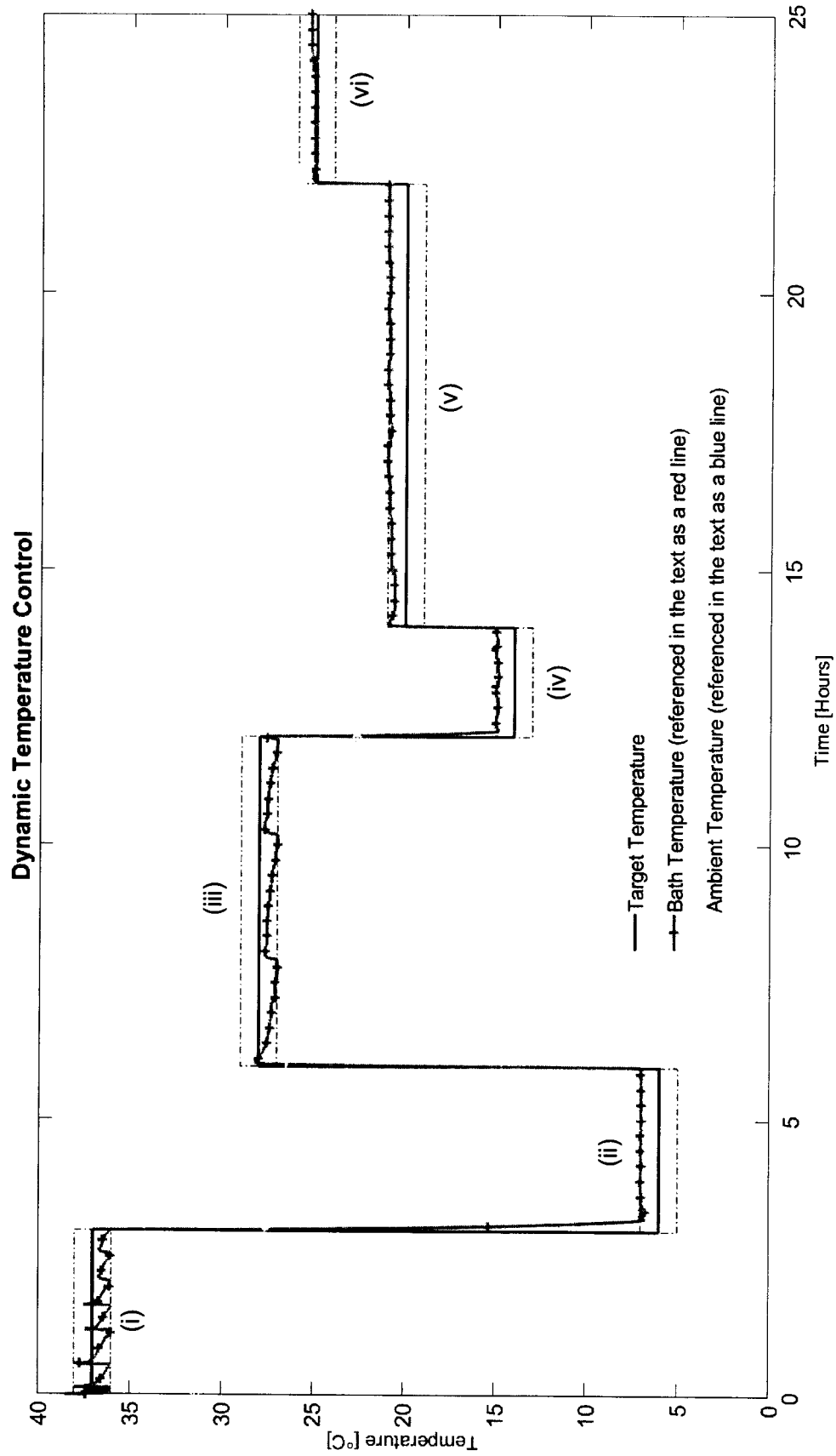
FIG. 17 is a graph showing an example of a test of one embodiment of the dynamic temperature regulating device where the dynamic temperature control is demonstrated.

A novel feature of this device is to dynamically control the temperature over a wide range of set points, independently of the external environment temperatures. Presented in the FIG. 17 is temperature data collected during testing of one embodiment of the dynamic temperature regulating device. As the results demonstrate, the device both accurately maintains temperatures and shows the ability of dynamic temperature control, by varying the temperature-controlled chamber between six temperature set points denoted with (i) through (vi).

The dynamic temperature regulating device is able to rapidly vary and control the temperature of the temperature-controlled chamber between a wide range of values. During data collection, the ambient air temperature varied between 21° C. to 33° C. (denoted by the blue line), while the set points varied between 6° C. to 37° C. (denoted by the black line). The dashed black lines denote temperature bounds which were set for testing and these bounds can be expanded or narrowed depending on the specific application. At each temperature set point, the dynamic temperature regulating device is capable of precisely maintaining the temperature of the temperature-controlled chamber (denoted by the red line), independent of the external ambient air temperature.

Generally speaking, the systems described herein are directed to temperature-controlled devices. Various embodiments and aspects of the disclosure are described in the detailed description. The description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein the "operably connected" or "operably attached" means that the two elements are connected or attached either directly or indirectly. Accordingly, the items need not be directly connected or attached but may have other items connected or attached therebetween.

As used herein the "at least one" means that a minimum of one of the element is used. Alternatively, it also contemplates that a plurality of the element may also be used.

What is claimed is:

1. A portable dynamic temperature regulating device for use in association with a portable temperature-controlled container, comprising:
   at least one PCM (phase change material) heat source, such that the at least one conditioned PCM heat source is in a liquid state above its freezing temperature and is disconnected from an external heat source before use;
   at least one PCM heat sink, such that the at least one conditioned PCM heat sink is in a solid state below its melting temperature and is disconnected from an external cooling source before use;
   at least one heat source conduit with working heat exchange fluid therein in thermal communication with the at least one PCM heat source, the at least one heat source conduit being operably connected to the temperature-controlled container;
   at least one heat sink conduit with working heat exchange fluid therein in thermal communication with the at least one PCM heat sink, the at least one heat sink conduit being operably connected to the temperature-controlled container;
   whereby the working heat exchange fluid in the at least one heat source conduit and the working heat exchange fluid in the at least one heat sink conduit are each simultaneously available to be connected to the temperature controlled container;
   a portable housing having the at least one PCM heat source, the at least one heat source conduit, the at least one PCM heat sink and the at least one heat sink conduit housed therein; and
   a control system for controlling the selective connection with the working heat exchange fluid in the at least one heat source conduit and the working heat exchange fluid in the at least one heat sink conduit to dynamically regulate the temperature in the portable temperature-controlled container.

2. The portable dynamic temperature regulating device as claimed in claim 1 wherein each PCM is in a PCM housing.

3. The portable dynamic temperature regulating device as claimed in claim 2 wherein the PCM housing of each PCM is sealed.

4. The portable dynamic temperature regulating device as claimed in claim 2 wherein the PCM housing of each PCM is sealed and watertight.

5. The portable dynamic temperature regulating device as claimed in claim 4 wherein the PCM housing includes a selective portion being a housing heat transfer medium.

6. The portable dynamic temperature regulating device as claimed in claim 5 wherein housing heat transfer medium includes an internal portion.

7. The portable dynamic temperature regulating device as claimed in claim 6 wherein the internal portion of the housing heat transfer medium includes at least one fin.

8. The portable dynamic temperature regulating device as claimed in claim 6 wherein the internal portion of the housing heat transfer medium includes at least one tube.

9. The portable dynamic temperature regulating device as claimed in claim 8 wherein each tube is filled with heat transfer fluid.

10. The portable dynamic temperature regulating device as claimed in claim 6 wherein the internal portion of the housing heat transfer medium includes at least one heat pipe.

11. The portable dynamic temperature regulating device as claimed in claim 6 wherein the internal portion of the housing heat transfer medium is a heat transfer porous material.

12. The portable dynamic temperature regulating device as claimed in claim 6 wherein the internal portion of the housing heat transfer medium is a combination of at least two of at least one fin, at least one tube, at least one heat pipe, a heat transfer porous material.

13. The portable dynamic temperature regulating device as claimed in claim 2 further includes at least one heat transfer enhancement device in thermal communication with the PCM housing.

14. The portable dynamic temperature regulating device as claimed in claim 13 wherein the at least one heat transfer enhancement device includes at least one heat pipes.

15. The portable dynamic temperature regulating device as claimed in claim 14 wherein the at least one heat transfer enhancement device includes at least one heat transfer fin.

16. The portable dynamic temperature regulating device as claimed in claim 1 further including a heat transfer element and wherein the heat transfer element contains the at least one heat source conduit and the at least one heat sink conduit, the at least one PCM heat source is detachably connected to the heat transfer element and the at least one PCM heat sink is detachably connected to the heat transfer element.

17. The portable dynamic temperature regulating device as claimed in claim 16 wherein the heat transfer element includes a solid plate.

18. The portable dynamic temperature regulating device as claimed in claim 1 wherein the at least one heat source defines a heat source volume for the working heat exchange fluid and the at least one heat sink source defines a heat sink volume for the working heat exchange fluid and at least one device operably connected to the working heat-exchange fluid for selectively moving the working heat-exchange fluid through the heat source volume, for selectively moving the working heat exchange fluid through the heat sink volume.

19. The portable dynamic temperature regulating device as claimed in claim 18 wherein the working heat-exchange fluid includes a heat source working heat exchange fluid and a heat sink working heat-exchange fluid and the heat source working heat exchange fluid is in flow communication with the heat source volume and the heat sink working heat-exchange fluid is in flow communication with the heat sink volume.

20. The portable dynamic temperature regulating device as claimed in claim 18 wherein the same working heat-exchange fluid is in flow communication with the heat source volume and the heat sink volume.

21. The portable dynamic temperature regulating device as claimed in claim 18 wherein the working heat exchange fluid is in flow communication with the portable temperature-controlled container.

22. The portable dynamic temperature regulating device as claimed in claim 18 wherein the working heat exchange fluid is the same fluid as inside the portable temperature-controlled container.

23. The portable dynamic temperature regulating device as claimed in 19 wherein the portable temperature-controlled container includes a first heat exchanger in flow communication with the heat source working heat-exchange fluid and a second heat exchanger in flow communication with heat sink working heat-exchange fluid.

24. The portable dynamic temperature regulating device as claimed in 19 wherein the portable temperature-controlled container includes one heat exchanger in flow communication with the heat source working heat-exchange fluid and the heat sink working heat-exchange fluid.

25. The portable dynamic temperature regulating device as claimed in claim 18 wherein the working heat-exchange fluid is a liquid and the fluid moving device is a pump.

26. The portable dynamic temperature regulating device as claimed in claim 18 wherein the working heat-exchange fluid is a gas and the fluid moving device is a fan or a blower.

27. The portable dynamic temperature regulating device as claimed in claim 1 wherein the dynamic temperature regulating device and the portable temperature-controlled container include a plurality of sensors and the control system is operably connected to the sensors.

28. The portable dynamic temperature regulating device as claimed in claim 27 wherein the temperature of the portable temperature-controlled container is modified responsive to the temperature and/or other variables/parameters measured and communicated by the sensors and desired predetermined outcomes.

29. The portable dynamic temperature regulating device as claimed in claim 28 wherein the desired predetermined outcome is one of that the temperature of the portable temperature-controlled container is maintained at a predetermined target temperature; that the temperature of the portable temperature-controlled container is maintained within a target threshold of a predetermined target temperature range; and that the temperature of the portable temperature-controlled container is maintained within a target threshold of a predetermined target temperature for a predetermined period of time.

30. The portable dynamic temperature regulating device as claimed in claim 28 wherein the desired predetermined outcome is that the temperature of the portable temperature-controlled container is raised to a predetermined target temperature.

31. The portable dynamic temperature regulating device as claimed in claim 28 wherein the desired predetermined outcome is that the temperature of the portable temperature-controlled container is lowered to a predetermined target temperature.

32. The portable dynamic temperature regulating device as claimed in claim 28 wherein the desired predetermined outcome is that the temperature of the portable temperature-controlled container is maintained at a predetermined target temperature or within a target threshold of a predetermined target temperature range.

33. The portable dynamic temperature regulating device as claimed in claim 18 wherein the heat-exchange fluid is a buffer.

34. The portable dynamic temperature regulating device as claimed in claim 18 whereby the portable temperature-controlled container has sterile fluid therein and the heat-exchange fluid provides thermal regulation to the sterile fluid in the portable temperature-controlled container, whereby the thermally regulated sterile fluid is used for perfusion.

35. The portable dynamic temperature regulating device as claimed in claim 1 wherein the control system further includes a remote controller that is operably connected to the control system but not physically connected to the control system.

36. The portable dynamic temperature regulating device as claimed in claim 1 wherein at least one heat source is a plurality of heat source volumes.

37. The portable dynamic temperature regulating device as claimed in claim 36 wherein the plurality of heat source volumes include PCM's having different melting temperatures.

38. The portable dynamic temperature regulating device as claimed in claim 1 wherein at least one heat sink is a plurality of heat sink volumes.

39. The portable dynamic temperature regulating device as claimed in claim 38 wherein the plurality of heat sink volumes include PCM's having different melting temperatures.

* * * * *